(12) United States Patent
Rope et al.

(10) Patent No.: US 10,395,215 B2
(45) Date of Patent: Aug. 27, 2019

(54) INTERPRETATION OF STATISTICAL RESULTS

(71) Applicant: International Business Machines Corporation, Armonk, NY (US)

(72) Inventors: Daniel J. Rope, Reston, VA (US);
Jing-Yun Shyr, Naperville, IL (US);
Margaret J. Vais, Mount Prospect, IL (US); Michael D. Woods, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/656,455

(22) Filed: Oct. 19, 2012

(65) Prior Publication Data

US 2014/0114707 A1 Apr. 24, 2014

(51) Int. Cl.
*G06Q 10/10* (2012.01)
*G06Q 10/06* (2012.01)

(52) U.S. Cl.
CPC .......... *G06Q 10/10* (2013.01); *G06Q 10/063* (2013.01)

(58) Field of Classification Search
CPC .............................. G06Q 10/10; G06Q 10/063
USPC ........................................................ 705/7.11
See application file for complete search history.

(56) References Cited

U.S. PATENT DOCUMENTS

| | | | |
|---|---|---|---|
| 5,461,699 A | 10/1995 | Arbabi et al. | |
| 6,466,929 B1 | 10/2002 | Brown et al. | |
| 6,477,534 B1 | 11/2002 | Acharya et al. | |
| 6,812,926 B1 | 11/2004 | Rugge | |
| 6,813,615 B1 | 11/2004 | Colasanti et al. | |
| 6,976,031 B1 | 12/2005 | Toupal et al. | |
| 7,225,113 B2 | 5/2007 | Rothschild | |
| 7,251,639 B2 | 7/2007 | Bernhardt et al. | |
| 7,493,319 B1 | 2/2009 | Dash et al. | |
| 7,818,318 B2 | 10/2010 | Berger et al. | |
| 7,933,762 B2* | 4/2011 | Pinto et al. | 703/22 |
| 7,978,195 B2* | 7/2011 | Palmer | 345/440 |
| 8,037,000 B2 | 10/2011 | Delmonico et al. | |
| 2002/0103836 A1 | 8/2002 | Fein et al. | |
| 2002/0161853 A1 | 10/2002 | Burak et al. | |
| 2003/0034995 A1 | 2/2003 | Osborn et al. | |
| 2003/0112234 A1* | 6/2003 | Brown et al. | 345/419 |
| 2004/0049729 A1* | 3/2004 | Penfield | G06F 17/246 715/222 |

(Continued)

OTHER PUBLICATIONS

Tomz, Michael, Jason Wittenberg, and Gary King. 2003. Clarify: Software for interpreting and presenting statistical results. Journal of Statistical Software 8(1): 1-30. (Year: 2003).*

(Continued)

*Primary Examiner* — Timothy Padot
*Assistant Examiner* — Darlene Garcia-Guerra
(74) *Attorney, Agent, or Firm* — Konrad Raynes Davda & Victor LLP; Janaki K. Davda

(57) ABSTRACT

Provided are techniques for summarizing statistical results. Multiple sets of statistical results are received, wherein each of the sets of statistical results are ordered according to interestingness. Insights are generated based on the multiple sets of statistical results. Relationships between the generated insights are identified. An executive summary is generated with a set of findings based on the identified relationships. An interactive visualization is provided with the generated insights based on the executive summary.

12 Claims, 23 Drawing Sheets

(56) References Cited

U.S. PATENT DOCUMENTS

| | | | |
|---|---|---|---|
| 2005/0021286 A1* | 1/2005 | Kunce | G06F 17/18 702/179 |
| 2005/0149505 A1 | 7/2005 | Bossman et al. | |
| 2005/0234763 A1* | 10/2005 | Pinto | G06Q 30/0201 706/21 |
| 2006/0015291 A1* | 1/2006 | Parks | G06F 19/26 702/179 |
| 2006/0161403 A1* | 7/2006 | Jiang | G06F 17/18 703/2 |
| 2006/0167655 A1* | 7/2006 | Barrow | G06Q 40/08 702/181 |
| 2006/0184464 A1* | 8/2006 | Tseng et al. | 706/14 |
| 2006/0242139 A1 | 10/2006 | Butterfield et al. | |
| 2007/0168154 A1* | 7/2007 | Ericson | 702/179 |
| 2008/0086436 A1 | 4/2008 | Zhao et al. | |
| 2008/0126277 A1* | 5/2008 | Williams | G09B 19/00 706/14 |
| 2008/0167838 A1* | 7/2008 | Long | H04L 1/20 702/180 |
| 2008/0195650 A1* | 8/2008 | Lingenfelder | G06N 99/005 |
| 2009/0006438 A1* | 1/2009 | Tunkelang et al. | 707/101 |
| 2009/0030875 A1 | 1/2009 | Bossman et al. | |
| 2009/0171705 A1 | 7/2009 | Bobak et al. | |
| 2009/0183106 A1* | 7/2009 | Dotson et al. | 715/772 |
| 2009/0240644 A1 | 9/2009 | Boettcher et al. | |
| 2009/0248489 A1 | 10/2009 | Moncreiff | |
| 2009/0248490 A1* | 10/2009 | Moncreiff | 705/10 |
| 2009/0287673 A1 | 11/2009 | Chronister et al. | |
| 2010/0049538 A1 | 2/2010 | Frazer et al. | |
| 2010/0070382 A1 | 3/2010 | Inghelbrecht et al. | |
| 2010/0145720 A1* | 6/2010 | Reiner | G06F 19/3443 705/2 |
| 2010/0153332 A1* | 6/2010 | Rollins et al. | 707/603 |
| 2010/0174670 A1 | 7/2010 | Malik et al. | |
| 2010/0179948 A1* | 7/2010 | Xie et al. | 707/706 |
| 2010/0235343 A1 | 9/2010 | Cao et al. | |
| 2011/0040168 A1* | 2/2011 | Arnaud | G06T 7/0012 600/407 |
| 2011/0046968 A1* | 2/2011 | Hawthorne, III | G06Q 30/02 705/1.1 |
| 2011/0307422 A1* | 12/2011 | Drucker et al. | 706/12 |
| 2012/0036103 A1* | 2/2012 | Stupp et al. | 706/58 |
| 2012/0313947 A1* | 12/2012 | Rope | G06T 11/206 345/440 |
| 2013/0006591 A1* | 1/2013 | Pyrcz | G01V 99/005 703/2 |
| 2013/0007003 A1 | 1/2013 | Shyr et al. | |
| 2013/0268520 A1* | 10/2013 | Fisher | G06F 17/30554 707/723 |

OTHER PUBLICATIONS

Toward a Deeper Understanding of the Role of Interaction in Information Visualization, Ji Soo Yi et al., Published in: IEEE, Transactions on Visualization and Computer Graphics (vol. 13 , Issue: 6, Nov.-Dec. 2007) (Year: 2007).*

Blanchard, J., F. Guillet, and H. Briand, "A User-driven and Quality-oriented Visualization for Mining Association Rules", Proceedings of the Third IEEE International Conference on Data Mining (ICDM'03), © 2003 IEEE, Total 4 pp (Also ICDM 3rd International Conference on, Nov. 19-22, 2003, pp. 493-497).

Hogl, O., M. Muller, H. Stoyan, and W. Stuhlinger, "On Supporting Medical Quality with Intelligent Data Mining", Proceedings of the 34th Hawaii International Conference on System Sciences—2001, © 2001 IEEE, Total 10 pp (Also Proceedings of the 34th Annual Hawaii International Conference on, Jan. 3-6, 2001, pp. 1-10).

Li, Y and Y. LV, "Research on Different Customer Purchase Patterns Based on Subjective Interestingness", 2007 International Conference on Management Science & Engineering (14th), Aug. 20-22, 2007, Total 6 pp (Also ICMSE International Conference on, Aug. 20-22, 2007, pp. 3-8).

Malik, H.H. and J.R. Kender, "High Quality, Efficient Hierarchical Document Clustering using Closed Interesting Itemsets", Proceedings of the Sixth International Conference on Data Mining (ICDM'06), © 2006 IEEE, Total 6 pp (Also ICDM 6th Inter. Conf. on, Dec. 18-22, 2006, pp. 991-996).

Preliminary Amendment, dated Sep. 13, 2012, for U.S. Appl. No. 13/172,707, filed Jun. 29, 2011 by J. Shyr et al., Total 6 pp. [57.244 (PrelimAmend)].

Preliminary Amendment, dated Sep. 13, 2012, for U.S. Appl. No. 13/614,335, filed Sep. 13, 2012 by J. Shyr et al., Total 6 pp. [57.244C1 (PrelimAmend)].

Shillabeer, A. and J.F. Roddick, "Reconceptualising Interestingness Metrics for Medical Data Mining", [online] Retrieved from the Internet at URL: <http://citeseerx.ist.psu.edu/viewdoc/download; jsessionid=5EAE759245971AF2DC5A0AD65C597BF3?doi=10.1. 1.90.776&rep=rep1&type=pdf>, 2005, Total 10 pp.

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", National Institute of Standards and Technology, Jan. 2011, Total 7 pp.

U.S. Appl. No. 13/154,594, filed Jun. 7, 2011, entitled "Automatic Selection of Different Visualizations for the Organization of Multivariate Data", invented by Wills, G., and Rope, D., (2011), Total 57 pp.

U.S. Appl. No. 13/172,707, filed Jun. 29, 2011, entitled "Interestingness of Data", invented by Shyr, Jing-Yun, D. Spisic, R. Wright, J. Xu, and X. Zhang, Total 54 pp.

Amendment 1, dated Jun. 13, 2013, for U.S. Appl. No. 13/172,707, filed Jun. 29, 2011 by J. Shyr et al., Total 11 pp. [57.244 Amend1)].

Office Action 1, dated Mar. 21, 2013, for U.S. Appl. No. 13/172,707, filed Jun. 29, 2011 by J. Shyr et al., Total 22 pp. [57.244 (OA1)].

Final Office Action 1, dated Sep. 16, 2013, for U.S. Appl. No. 13/172,707, filed Jun. 29, 2011 by J. Shyr et al., Total 26 pp. [57.244 (FOA)].

Pre-Appeal Brief Request for Review, Dec. 16, 2013, for U.S. Appl. No. 13/172,707, filed Jun. 29, 2011 by J. Shyr et al., Total 5 pp. [57.244 (Pre-Apl Brf Req)].

Notice of Allowance, dated Mar. 14, 2014, for U.S. Appl. No. 13/172,707, filed Jun. 29, 2011 by J. Shyr et al., Total 8 pp. [57.244 (NOA)].

Notice of Allowance 2, dated Jun. 20, 2014, for U.S. Appl. No. 13/172,707, filed Jun. 29, 2011 by J. Shyr et al., Total 12 pp. [57.244 (NOA2)].

Supplemental Notice of Allowability, dated Jul. 15, 2014, for U.S. Appl. No. 13/172,707, filed Jun. 29, 2011 by J. Shyr et. al., Total 8 pp. [57.244 (SuppNtcAllowability)].

Office Action 1, dated Oct. 15, 2013, for U.S. Appl. No. 13/614,335, filed Sep. 13, 2012 by J. Shyr et al., Total 17 pp. [57.244C1 (OA1)].

Response to Office Action 1, dated Jan. 15, 2014, for U.S. Appl. No. 13/614,335, filed Sep. 13, 2012 by J. Shyr et al., Total 7 pp. [57.244C1 (ROA1)].

Final Office Action, dated Mar. 13, 2014, for U.S. Appl. No. 13/614,335, filed Sep. 13, 2012 by J. Shyr et al., Total 14 pp. [57.244C1 (Foa)].

Response to Final Office Action, dated Apr. 21, 2014, for U.S. Appl. No. 13/614,335, filed Sep. 13, 2012 by J. Shyr et al., Total 4 pp. [57.244C1 (RFOA)].

Notice of Allowance, dated May 14, 2014, for U.S. Appl. No. 13/614,335, filed Sep. 13, 2012 by J. Shyr et al., Total 11 pp. [57.244C1 (NOA)].

Corrected Notice of Allowability, dated Jun. 20, 2014, for U.S. Appl. No. 13/614,335, filed Sep. 13, 2012 by J. Shyr et al., Total 7 pp. [57.244C1 (CorrNtcAllowability)].

Supplemental Notice of Allowability, dated Jul. 16, 2014, for U.S. Appl. No. 13/614,335, filed Sep. 13, 2012 by J. Shyr et al., Total 8 pp. [57.244C1 (SuppNtcAllowability)].

Supplemental Notice of Allowability, dated Aug. 8, 2014, for U.S. Appl. No. 13/614,335, filed Sep. 13, 2012 by J. Shyr et al., Total 8 pp. [57.244C1 (SuppNtcAllowability)].

* cited by examiner

**BoardingArea * AirportRating Crosstab**

Count

| | | AirportRating | | | | | Total |
|---|---|---|---|---|---|---|---|
| | | Fair | Good | Poor | Very Good | Very Poor | |
| BoardingArea | B | 2 | 84 | 6 | 42 | 1 | 192 |
| | C | 1 | 79 | 3 | 36 | 1 | 165 |
| | E | 0 | 96 | 1 | 40 | 0 | 177 |
| | F | 4 | 235 | 2 | 117 | 1 | 461 |
| | I | 11 | 207 | 2 | 122 | 1 | 405 |
| Total | | 18 | 701 | 14 | 357 | 4 | 1400 |

Symmetric Measures

| | | Value | Approx. Sig. |
|---|---|---|---|
| Nominal by Nominal | Phi | .185 | .000 |
| | Cramer's V | .093 | .000 |
| N of Valid Cases | | 1400 | | a. Not assuming the null hypothesis.
b. Using the asymptotic standard error assuming the null hypothesis.

FIG. 10A

**BoardingArea * ArtRating Crosstab** — 1010

Count

| | | ArtRating | | | | | Total |
|---|---|---|---|---|---|---|---|
| | | Fair | Good | Poor | Very Good | Very Poor | |
| BoardingArea | B | 71 | 48 | 9 | 20 | 0 | 192 |
| | C | 43 | 47 | 7 | 34 | 1 | 165 |
| | E | 86 | 33 | 3 | 29 | 2 | 177 |
| | F | 119 | 177 | 4 | 94 | 1 | 461 |
| | I | 85 | 164 | 2 | 99 | 0 | 405 |
| Total | | 404 | 469 | 25 | 276 | 4 | 1400 |

Symmetric Measures

| | | Value | Approx. Sig. |
|---|---|---|---|
| Nominal by Nominal | Phi | .289 | .000 |
| | Cramer's V | .145 | .000 |
| N of Valid Cases | | 1400 | | a. Not assuming the null hypothesis.
b. Using the asymptotic standard error assuming the null hypothesis.

FIG. 10B

**BoardingArea * RestaurantRating**

Count

Crosstab

| | | RestaurantRating | | | | Total |
|---|---|---|---|---|---|---|
| | | Fair | Good | Poor | Very Good | Very Poor | |
| BoardingArea | B | 65 | 66 | 36 | 17 | 7 | 1 | 192 |
| | C | 49 | 51 | 38 | 17 | 10 | 0 | 165 |
| | E | 45 | 77 | 37 | 4 | 13 | 1 | 177 |
| | F | 111 | 132 | 146 | 10 | 62 | 0 | 461 |
| | I | 101 | 146 | 72 | 40 | 43 | 3 | 405 |
| Total | | 371 | 472 | 329 | 88 | 135 | 5 | 1400 |

*(Note: columns are Fair, Good, Poor, Very Good, Very Poor, Total)*

Symmetric Measures

| | | Value | Approx. Sig. |
|---|---|---|---|
| Nominal by Nominal | Phi | .254 | .000 |
| | Cramer's V | .127 | .000 |
| N of Valid Cases | | 1400 | | a. Not assuming the null hypothesis.
b. Using the asymptotic standard error assuming the null hypothesis.

BoardingArea * RestaurantRating

Correlations — 1022

| | | Overall Satisfaction | Overall Cleanliness | Restaurant Spending | RetailShop Spending |
|---|---|---|---|---|---|
| OverallSatisfaction | Pearson Correlation | 1 | .395** | .061* | .030 |
| | Sig (2-tailed) | | .000 | .023 | .261 |
| | N | 1396 | 1384 | 1396 | 1396 |
| OverallCleanliness | Pearson Correlation | .395** | 1 | .066* | -.018 |
| | Sig (2-tailed) | .000 | | .014 | .505 |
| | N | 1384 | 1384 | 1384 | 1384 |
| RestaurantSpending | Pearson Correlation | .061* | .066* | 1 | -.180** |
| | Sig (2-tailed) | .023 | .014 | | .000 |
| | N | 1396 | 1384 | 1400 | 1400 |
| RetailShopSpending | Pearson Correlation | .030 | -.018 | -.180** | 1 |
| | Sig (2-tailed) | .261 | .505 | .000 | |
| | N | 1396 | 1384 | 1400 | 1400 |

**. Correlation is significant at the 0.01 level (2-tailed).
*. Correlation is significant at the 0.05 level (2-tailed).

Descriptive Statistics

| | Mean | Std. Deviation | N |
|---|---|---|---|
| OverallSatisfaction | 76.551 | 12.545 | 1396 |
| OverallCleanliness | 75.856 | 18.827 | 1384 |
| RestaurantSpending | 29.225 | 21.676 | 1400 |
| RetailShopSpending | 24.407 | 17.211 | 1400 |

FIG. 10D

**OverallCleanliness * BoardingArea**

Report

| OverallCleanliness | | | |
|---|---|---|---|
| BoardingArea | Mean | N | Std. Deviation |
| B | 68.589 | 189 | 20.474 |
| C | 73.153 | 163 | 20.586 |
| E | 75.668 | 177 | 17.655 |
| F | 75.306 | 455 | 19.009 |
| I | 81.100 | 400 | 15.954 |
| Total | 75.856 | 1384 | 18.827 |

ANOVA Table

| | | Sum of Squares | df | Mean Square | F | Sig. |
|---|---|---|---|---|---|---|
| OverallCleanliness * BoardingArea | Between Groups (Combined) | 22316.130 | 4 | 5579.032 | 16.441 | .000 |
| | Within Groups | 467937.949 | 1379 | 339.331 | | |
| | Total | 490254.079 | 1383 | | | |

Measures of Association

| | Eta | Eta Squared |
|---|---|---|
| OverallCleanliness * BoardingArea | .213 | .046 |

FIG. 10E

**OverallCleanliness * Language**

Report

| OverallCleanliness | | | |
|---|---|---|---|
| Language | Mean | N | Std. Deviation |
| Chinese | 77.188 | 54 | 12.396 |
| English | 75.643 | 1276 | 19.185 |
| Japanese | 73.130 | 30 | 14.125 |
| Spanish | 87.581 | 24 | 12.061 |
| Total | 75.856 | 1384 | 18.827 |

ANOVA Table

| | | Sum of Squares | df | Mean Square | F | Sig. |
|---|---|---|---|---|---|---|
| OverallCleanliness * Language | Between Groups (Combined) | 3675.546 | 3 | 1225.182 | 3.475 | .016 |
| | Within Groups | 486578.533 | 1380 | 352.593 | | |
| | Total | 490254.079 | 1383 | | | |

Measures of Association

| | Eta | Eta Squared |
|---|---|---|
| OverallCleanliness * Language | .087 | .007 |

FIG. 10F

**OverallCleanliness * AirportRating Report**

| OverallCleanliness | | | |
|---|---|---|---|
| AirportRating | Mean | N | Std. Deviation |
| Fair | 77.578 | 14 | 18.299 |
| Good | 67.722 | 300 | 19.602 |
| Poor | 75.001 | 698 | 17.603 |
| Very Good | 58.313 | 14 | 24.892 |
| Very Poor | 85.286 | 354 | 15.825 |
| Total | 56.010 | 4 | 16.236 |
| | 75.856 | 1384 | 18.827 |

ANOVA Table

| | | Sum of Squares | df | Mean Square | F | Sig. |
|---|---|---|---|---|---|---|
| OverallCleanliness * AirportRating | Between Groups (Combined) | 57765.406 | 5 | 11553.081 | 36.811 | .000 |
| | Within Groups | 432488.672 | 1378 | 313.852 | | |
| | Total | 490254.079 | 1383 | | | |

Measures of Association

| | Eta | Eta Squared |
|---|---|---|
| OverallCleanliness * AirportRating | .343 | .118 |

Executive Summary for Project: Airport Survey

Dataset Characteristics — 1110

| | |
|---|---|
| Number of records | 1,400 |
| Number of fields | 48 |
| Target fields | 4 |
| Overall Satisfaction | |
| Overall Cleanliness | |
| *2 other target fields...* | |
| Input fields | 42 |
| Record ID fields | 1 |
| Excluded fields | 1 |

Analytic Techniques — 1120

- Univariate descriptive statistics
- Multivariate exploratory analysis
- Linear predictive modeling Predictive models show interesting results for all four targets. — 1130

- Overall Cleanliness has average value 75.86. However, some records have extremely low values, with record number 216 having the lowest (4.10).
- The top three drivers of Overall Cleanliness are Restroom Cleanliness, Boarding Area Cleanliness, and Airport Cleanliness.
- Restroom Cleanliness and Boarding Area Cleanliness have a synergistic effect on Overall Cleanliness - considering both predictors together provides more information than simply the sum of their independent effects.
- For example, records with Very Poor responses for Boarding Area Cleanliness, and Fair or lower responses for Restroom Cleanliness, have unusually low Overall Cleanliness, as represented in the graphic, where some boxes indicate lower Overall Cleanliness.
- Similar synergistic effects are found for the other targets.
- For instance, Restaurant Spending has average value $29.23, but some records have extremely high values. When Purpose of Travel = Business and Terminal = International, the Restaurant Spending average is $79.04.

Other Key Findings — 1150

- There is a very strong relationship between Terminal and Boarding Area. These fields may be redundant.
- Language has values of Chinese, English, Japanese, and Spanish. English is by far the most common response, accounting for 1,291 of the 1,400 records.

FIG. 11

INTERPRETATION OF STATISTICAL RESULTS

FIELD

Embodiments of the invention relate to interpretation of statistical results.

BACKGROUND

Modern business intelligence software and recent predictive analytic software share a common goal: enable business users to glean insightful information hidden within large amounts of raw data. However, the technical approaches taken to accomplish the goal are different. Business intelligence software provides tools for aggregating and, then, interactively manipulating aggregations of data; whereas, predictive analytics provides statistical estimates, tests, and modeling capabilities.

Predictive analytics provides results that are mathematical statements about relationships, predictions, and levels of confidence for outcomes that are measured against these outcomes happening due to chance. Predictive analytics may require experts with graduate level degrees to properly apply the predictive analytics and interpret results.

Modern predictive analytic software may provide a simplified user interface that is provided to specify statistical procedures, increase the use of visualization within the output, and add interactive features. The output results may be expressed in expert terminology that is generic and in terms of the mathematical techniques.

SUMMARY

Provided are a method, computer program product, and system for summarizing statistical results. Multiple sets of statistical results are received, wherein each of the sets of statistical results are ordered according to interestingness. Insights are generated based on the multiple sets of statistical results. Relationships between the generated insights are identified. An executive summary is generated with a set of findings based on the identified relationships. An interactive visualization is provided with the generated insights based on the executive summary.

BRIEF DESCRIPTION OF THE SEVERAL VIEWS OF THE DRAWINGS

Referring now to the drawings in which like reference numbers represent corresponding parts throughout:

FIG. 6 is formed by FIG. 6A and FIG. 6B.

FIG. 9 is formed by FIG. 9A and FIG. 9B.

FIG. 10 illustrates a subset of statistical relationships results in accordance with certain embodiments. FIG. 10 is formed by FIG. 10A, FIG. 10B, FIG. 10C, FIG. 10D, FIG. 10E, FIG. 10F, and FIG. 10G.

FIG. 11 illustrates an executive summary in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
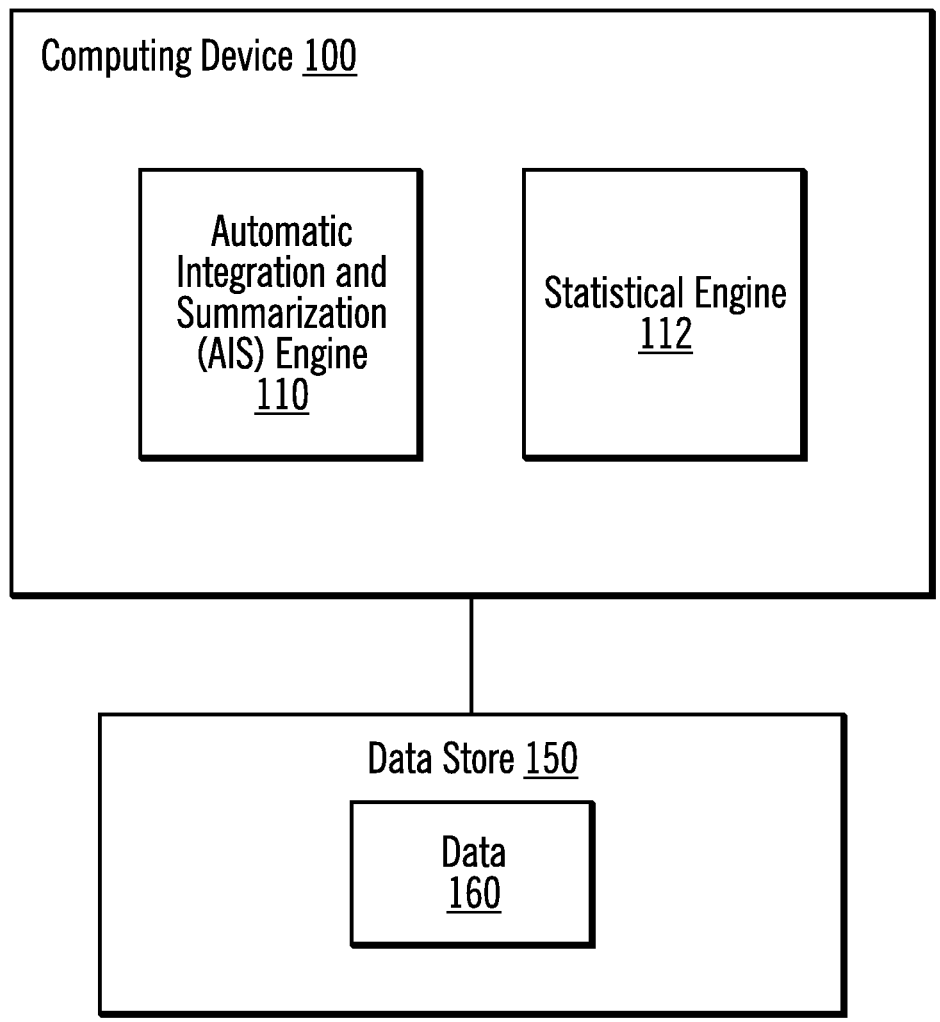
FIG. 1 illustrates a computing environment in accordance with certain embodiments.

FIG. 1 illustrates a computing environment in accordance with certain embodiments. A computing device 100 includes an Automatic Integration and Summarization (AIS) engine 110 and a statistical engine 110. The computing device 100 is coupled to a data store 150. The data store 150 stores data 160.

The AIS engine 110 automatically provides easily understood results of statistical techniques to enable business users to directly enjoy the insight capabilities of predictive analytics.

The AIS engine 110 enables users (e.g., those not highly trained in statistical sciences) to easily interpret and interact with the results of predictive analytic techniques. The AIS engine 110 automatically provides intuitive interpretation of statistical results.

In certain embodiments, the AIS engine 110 is embedded in a global system (e.g., a general purpose statistical software package that provides statistical results but not plain language interpretation) for data analysis.

Given an input dataset and any additional metadata, the AIS engine 110 automatically determines the appropriate statistical techniques and data visualizations. Based on these statistical techniques and data visualizations, the AIS engine 110 goes further and automatically interprets the output results.

More particularly, information and conclusions gleaned from any employed statistical techniques and visualizations are expressed directly in terms relevant to the user's problem space by:

(1) providing insights that are expressed in plain-language form in terms of the user's data; and (2) dynamically linking these insights to visual representations of the user's data that explicitly demonstrate, supplement, or provide extra context for what the given insight reveals.

The AIS engine 110 works in conjunction with the statistical engine 112, which programmatically executes statistical techniques upon supplied data. In certain embodiments, the results of any statistical technique are programmatically available for integration into the AIS engine 110. In various embodiments, the actual statistical routines may be parameterized either manually or automatically. The text and visual insights may be obtained from discoveries of the underlying statistical engine 112.

The AIS engine 110 begins with an input dataset and any additional metadata. The metadata itself may be input or automatically discovered. The AIS engine 110 performs the following processing to automatically provide more easily understood statistical results:
1. automatic statistical computation;
2. insight visualization creation;
3. hierarchical insight text generation; and
4. dynamic linking of insights to visualizations.
1. Automatic Statistical Computation Automatic statistical computation includes construction of an interestingness index for each field in a dataset, as well as for all bivariate and predictive model relationships. For a given field, the interestingness index is computed as a combination of standardized interestingness sub-indexes, where each sub-index is derived from a statistical metric for the field. For example, the sub-index for missing values may be based on the percentage of missing data values in the field. The interestingness index provides on overall summary and ranking of the field based on the statistical properties relevant to the user. The interestingness index allows the user to quickly evaluate the overall field contents. The same approach may be used to define an interestingness index for each higher-order statistical result (bivariates, predictive models, etc.) too.

Based on the data and metadata, automatic statistical computation uses internal rules to automatically assess properties of the fields (e.g., is a field categorical or continuous?), metadata (e.g., is a field a predictor or target?), violations of statistical assumptions (e.g., are two fields so highly correlated that they are redundant?), and determine the most appropriate statistical techniques to be used (e.g., perform linear regression or cluster analysis?). In various embodiments, various statistical techniques may be applied, including, but not limited to, exploratory univariate, bivariate, and multivariate analysis, hypothesis testing, predictive modeling, and cluster analysis. The AIS engine 110 performs the computations and then employs another set of internal rules to automatically determine the interestingness index of each result.

A categorical field may be described as having a finite number of nominal or ordinal categories as values. A continuous field may be described as having any numerical value. A predictor may be described as a field that predicts or influences a target in a predictive model. A target may be described as a field that is predicted or influenced by one or more predictors in a predictive model.

2. Insight Visualization Creation

Figure 2:
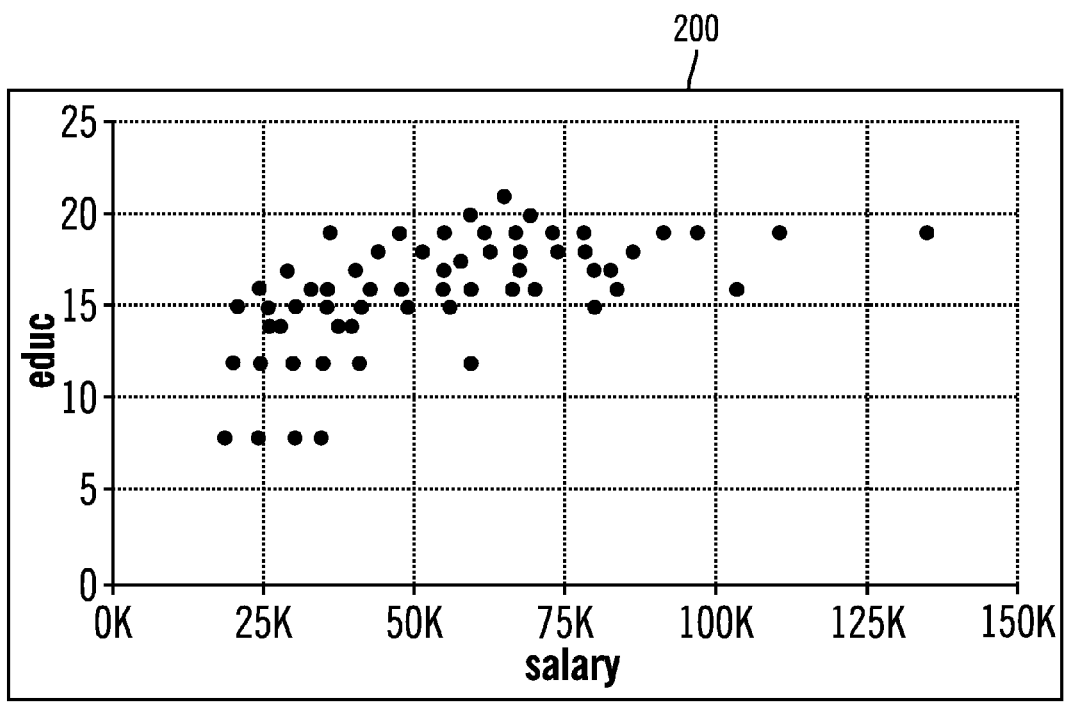
FIG. 2 illustrates an example of a base visualization, which is a scatter plot for two continuous fields, in accordance with certain embodiments.

For insight visualization creation, the AIS engine 110 automatically creates a base visualization that provides a summary of the statistical insight at its highest level. For example, a set of insights regarding the relationship between two fields may result in a visualization containing the two fields. The base visualization may be augmented dynamically in the processing of dynamic linking of insights to visualizations. FIG. 2 illustrates an example of a base visualization 200, which is a scatter plot for two continuous fields, in accordance with certain embodiments.

In certain embodiments, for insight visualization creation, the AIS engine 110 may automatically determine the best visualization for one or more fields or for a given statistical result.

3. Hierarchical Insight Text Generation

In certain embodiments, the AIS engine 110 employs an expert rule-based system that operates upon the resulting statistical and insight index output. Based upon expert knowledge contained within the rule-base, sentences are constructed that state the statistical conclusion in terms of the user's data using any available metadata, such as field names. The following is an example statistical conclusion: "There is a strong correlation between education and salary"

Figure 3:
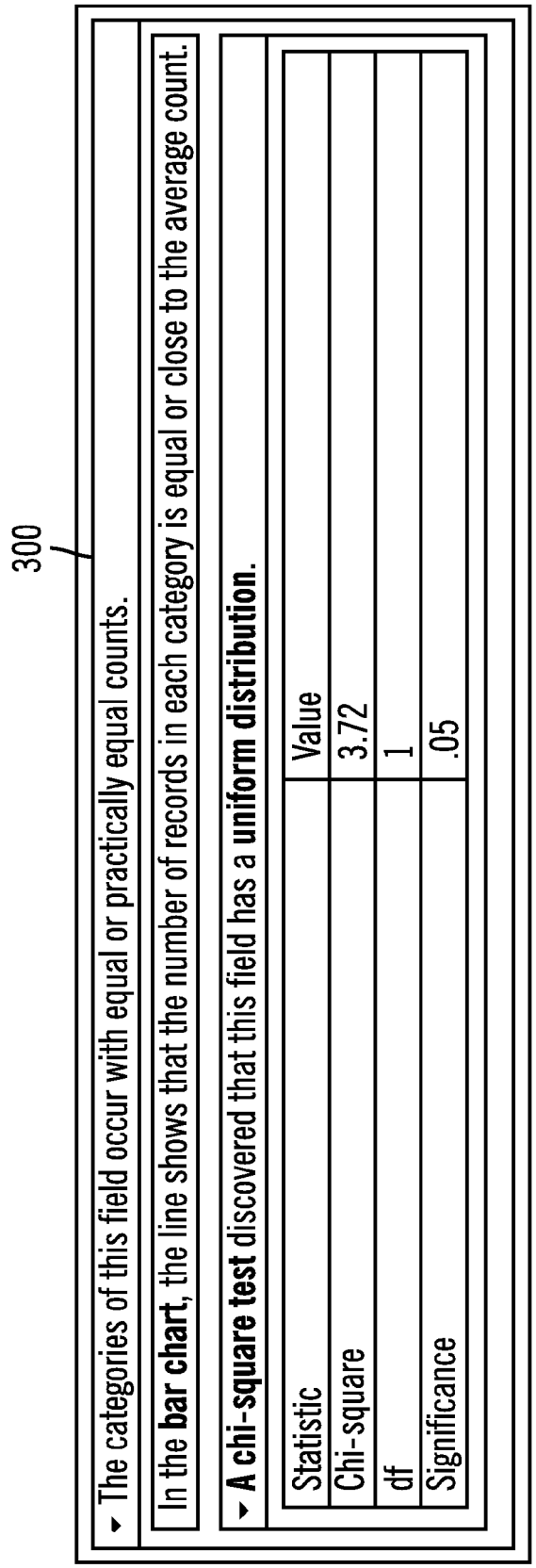
FIG. 3 illustrates an example of one insight series in a user interface that examines a categorical field in accordance with certain embodiments.

In certain embodiments, the AIS engine 110 organizes these textual insights into a series of hierarchies that progressively reveal greater technical detail. Each element in the series represents a different facet or insight of the statistical results. For example, the top level of each element in the hierarchy may be the most general insight for that facet, while lower levels of each element in the hierarchy drill down into details that disclose finer technical information. FIG. 3 illustrates an example of one insight series in a user interface 300 that examines a categorical field in accordance with certain embodiments. For example, the insight series indicates that the categories of this field occur with equal or practically equal counts. Also, the insight series provides information about a bar chart and about a chi-square test. The insight series provides information about statistics and values.

4. Dynamic Linking of Insights to Visualizations.

In certain embodiments, the AIS engine 110 presents a user with a series of hierarchical textual insights that describe the statistical results. The user can then select a desired text insight of interest. In response to the user's selection, the AIS engine 110 dynamically changes the base visualization to include graphical annotations that depict the newly selected text insight. In certain embodiments, associated dynamic visual insights may also become more detailed as the user travels down the text insight hierarchy. With embodiments, the annotations may be actual statistical insights in addition to or instead of simple text annotations, highlights, or other graphical decorations.

In certain embodiments, on a desktop computer, this selection may be triggered by a mouse roll-over because this is a fast gesture. This allows the user to quickly view different insights and retain conclusions in cognitive working memory. The actual change to the visualization is animated so the user's attention is drawn to the insight that is currently being explained. When the user moves the mouse off of the insight text, the added graphical effect disappears. However, a mouse click also causes the added visual effect to "stick" until the user clicks on the text insight a second time.

Figure 4:
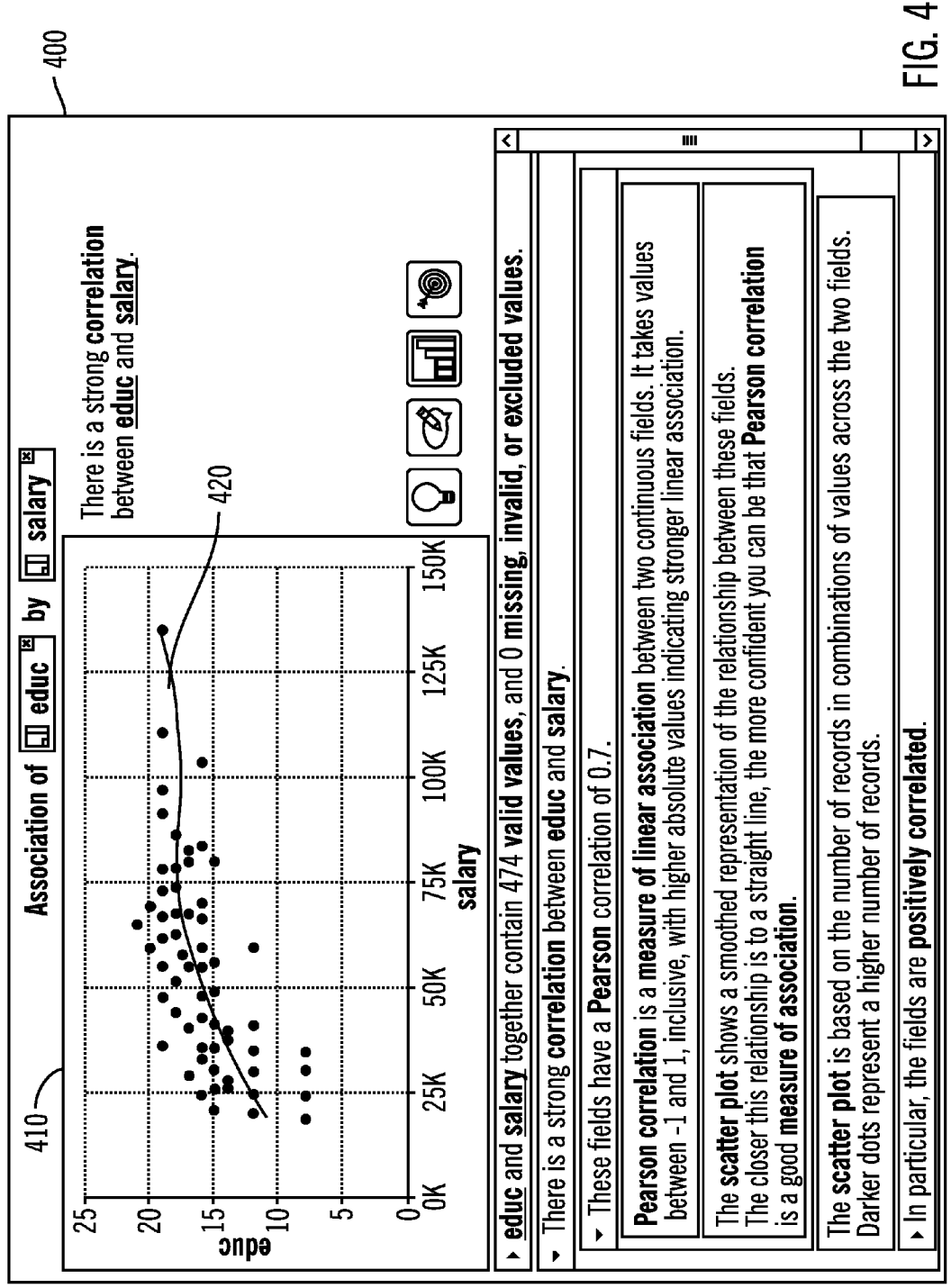
FIG. 4 illustrates an example of insights being linked to visualizations in a user interface in accordance with certain embodiments.

FIG. 4 illustrates an example of insights being linked to visualizations in a user interface 400 in accordance with certain embodiments. In FIG. 4, the AIS engine 410 adds a Locally weighted Scatterplot Smoothing (LOESS) smooth line 420 dynamically to a base visualization 410 when the user selects (e.g., rolls a mouse over) the phrase "There is a strong correlation between educ and salary." The user is now better equipped to judge the nature of the relationship between the two fields because the LOESS smooth line provides additional context.

An examination of association between fields is used as the example in FIG. 4, however, embodiments may be applied to any statistical technique.

The AIS engine 110 simplifies the ability of a business user who is not highly trained in statistics to enjoy the benefits of predictive analytics. In certain embodiments, the AIS engine 110 mimics an actual data analyst in its generality. Given a dataset, the AIS engine 110 performs an initial assessment of the data, determines the intent of the user (e.g. fit a predictive model or perform a segmentation analysis?), performs statistical computations, creates data visualizations, and interprets the results in the language of the user.

Figure 5:
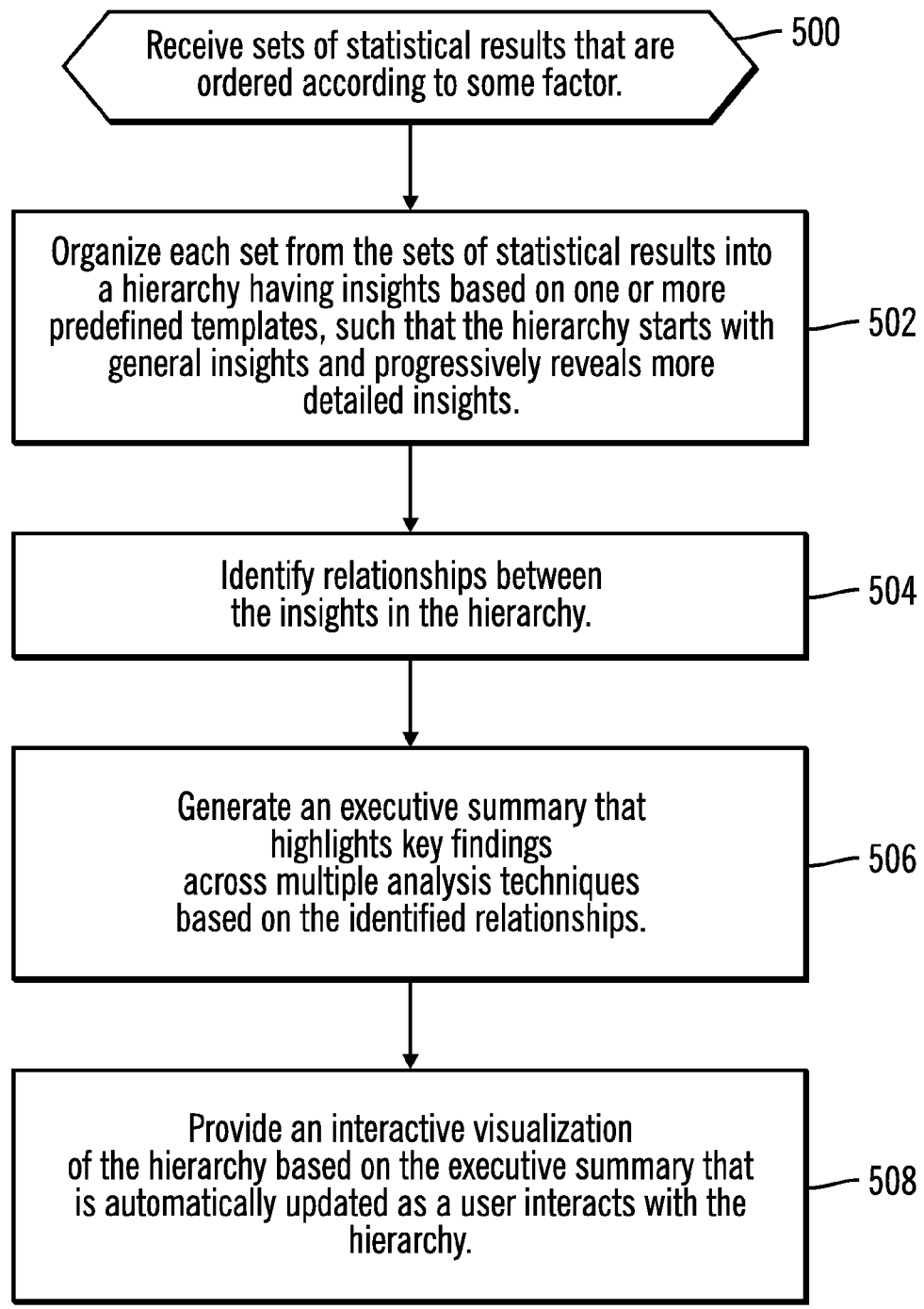
FIG. 5 illustrates, in a flow diagram, operations performed to automate the selection, interpretation, and further summarization of statistical results in accordance with certain embodiments.

FIG. 5 illustrates, in a flow diagram, operations performed to automate the selection, interpretation, and further summarization of statistical results in accordance with certain embodiments.

Control begins at block 500 with the AIS engine 110 receiving sets of statistical results (e.g., univariate, bivariate, decision tree, etc.) that are each ordered according to some factor (e.g., their interestingness). That is, the different sets of statistical results are each ordered (e.g., the various univariate results sets are ordered based on univariate interestingness).

In block 502, the AIS engine 110 organizes each set from the sets of statistical results into a hierarchy of insights based on one or more predefined templates, such that the hierarchy starts with general insights and progressively reveals more detailed insights. In certain embodiments, there is a different template for each type of set of statistical results (e.g., the univariate results template for a categorical field is different from the univariate results template for a continuous field). For example, FIG. 3 is generated by the univariate results template for a categorical field and exemplifies certain qualities a template has, such as: begin with a high level plain language insight, then elaborate via other insights linked dynamically to the visualization, and, if relevant, at the lowest level provide a table of numerical results so that an expert user might confirm the findings.

In certain embodiments, each insight in the hierarchy represents a different facet of the statistical results. For example, the top level of the hierarchy may be the most general insight for that facet, while lower levels of the hierarchy drill down into details that disclose finer technical information (i.e., more detailed insights).

In block 504, the AIS engine 110 identifies relationships between the insights in the hierarchy using heuristics, business rules, prior actions of one or more users, and/or other factors.

In block 506, the AIS engine 110 generates an executive summary that highlights findings across multiple analysis techniques based on the identified relationships. In certain embodiments, the executive summary highlights key findings. In certain embodiments, a key finding may be described as a result that is useful to the user. In an embodiment that does not input information concerning business rules or prior actions of users, a key finding might be based on a heuristic such as "results from the highest-order predictive model are more important than other results". In an embodiment that inputs business rules such as "I want to know the top drivers (predictors) of target Y", the key finding would be the ordered list of top drivers, and this list may be based on lower-order predictive models or even bivariate relationships, rather than the highest-order predictive model.

In block 508, the AIS engine 110 provides an interactive visualization of the hierarchy based on the executive summary that is automatically updated as the user interacts with the hierarchy. In particular, as a user selects a different insight (e.g., a plain language insight) of a hierarchy, the AIS engine 110 may update the visualization.

In certain embodiments, the AIS engine 110 processes data evaluation results (such as assessments of the modeling-readiness of the data and corrective transformations), processes statistics and visualizations in order to enable exploration of fields and relationships among fields, processes predictive model results (such as the best predictors of a target and interaction effects on a target), generates a hierarchical report for visualizing, explaining, and interacting with the results.

Generating the hierarchical report includes: generating an executive summary highlighting key findings across all analyses; progressive disclosure of statistical information, beginning with plain language insights and drilling down into numeric results, based on user interaction with the report; and simultaneous augmentation of the base visualization with the new statistical information based on user interaction with the report.

Figure 6A:
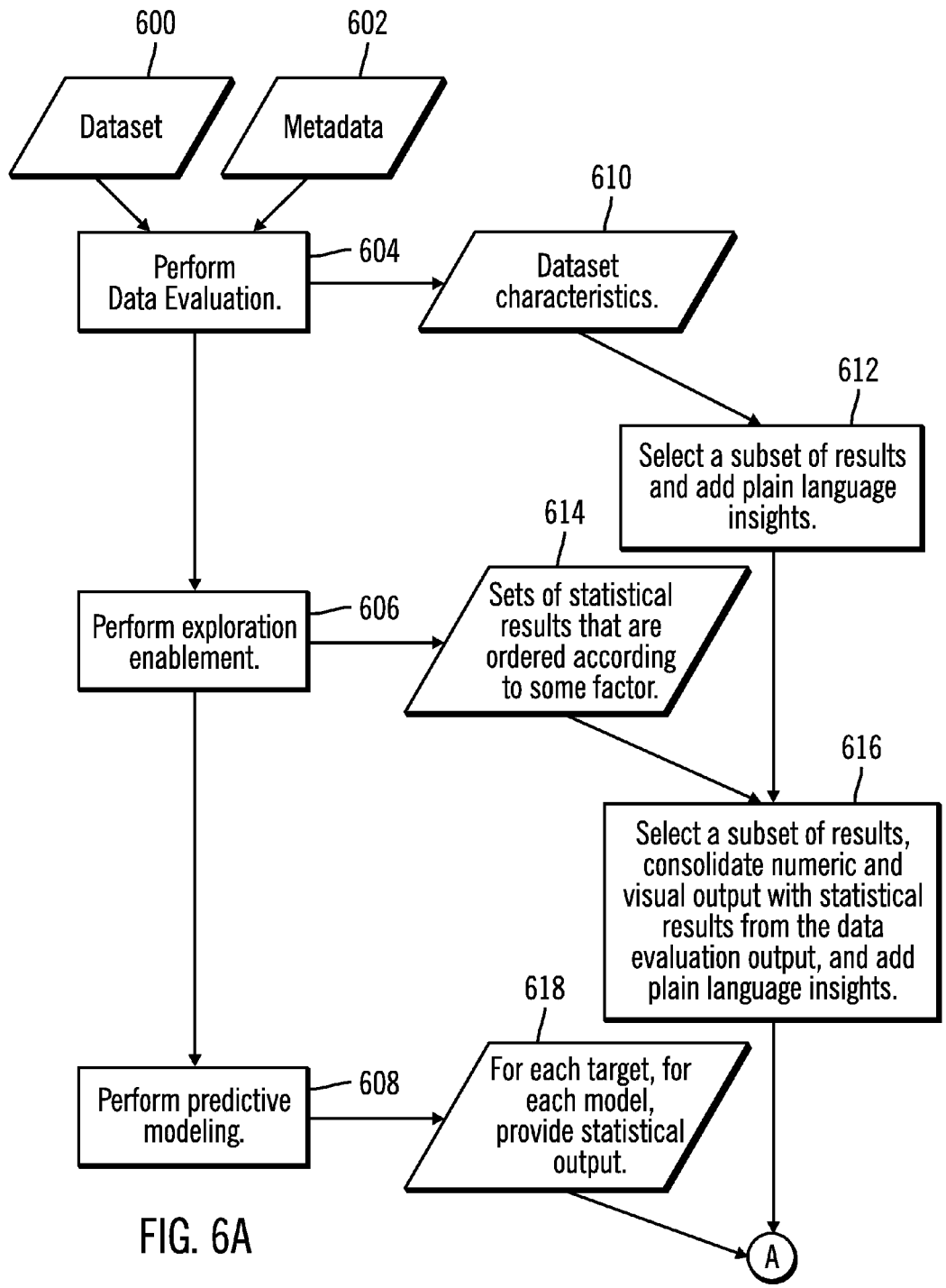
FIG. 6 illustrates, in a flow diagram, detailed operations performed to automate the selection, interpretation, and further summarization of statistical results in accordance with certain embodiments.
Figure 6B:
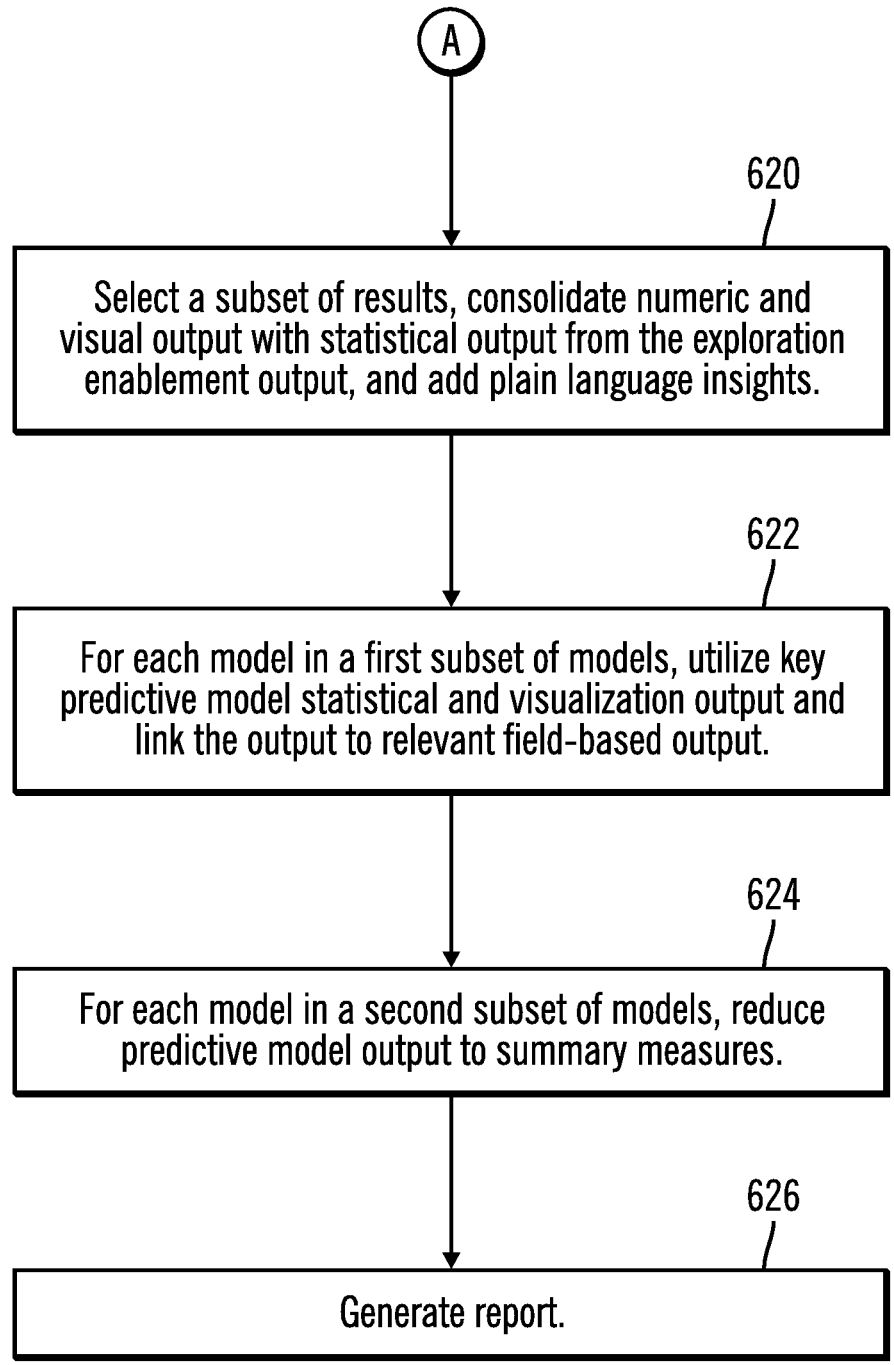

FIG. 6 illustrates, in a flow diagram, detailed operations performed to automate the selection, interpretation, and further summarization of statistical results in accordance with certain embodiments. FIG. 6 is formed by FIG. 6A and FIG. 6B.

In certain embodiments, the processing of blocks 604, 606, and 608 is performed by the statistical engine 112, and the processing of blocks 612, 616, and 620-626 is performed by the AIS engine 110. In such embodiments, the AIS engine 110 receives data 610, 614, and 618 from the statistical engine 112.

In FIG. 6, blocks 600-608 may be described as representing an automated data analysis technique that generates and orders statistical results based on multidimensional assessments of interestingness. Blocks 600-608 may be said to provide a context on which the right side operates.

While blocks 604-608 automate the generation and ordering of the statistical results, blocks 612, 616, and 620-626 determine how these results are used. In blocks 612, 616, and 620-626, the AIS engine 110 collects the results, selects those that are most important, consolidates the relevant numeric and visual output, and adds plain language interpretations.

Blocks 612, 616, and 620-626 use rules to process the results. In certain embodiments, heuristics may be used to make decisions. In certain embodiments, business-level metadata and/or prior actions of one or more users (e.g., a group of users working on the same data) may be used make decisions.

In FIG. 6A, control begins with the statistical engine 112 receiving a dataset 600 and metadata 602. In block 604, the statistical engine 112 performs data evaluation and outputs data characteristics 610. Further details of data evaluation are described with reference to FIG. 7. The data characteristics 610 may include, for example, a number of records and a number of fields, a taxonomy of the fields (e.g., whether each of the fields is a target, a predictor, etc.), transformations along with an explanation of why the transformations occur, and excluded fields along with an explanation of why the fields are excluded.

In block 612, the AIS engine 110 receives the data characteristics 610, selects a subset of results (e.g., number of records, number of fields, which fields are targets, etc.), and adds plain language insights to the subset of results (e.g., depending on the template). In certain embodiments, the most important results are selected in block 612. With reference to blocks 612, 616, and 620, in certain embodiments, importance may be described as a combination of the interestingness indices from the statistical engine 112 with the heuristics, business rules, etc. that are used to obtain the key findings. From block 612, processing continues to block 616.

In block 606, the statistical engine 112 performs exploration enablement and outputs sets of statistical results 614 that are ordered according to some factor. Further details of exploration enablement are described with reference to FIG. 8. In certain embodiments, the statistical results 614 include univariate and bivariate statistics and visualizations in decreasing order of interestingness. In block 616, the AIS engine 110 receives the statistical results 614, selects a subset of results, consolidates numeric and visual output with data characteristics 610 (i.e., data evaluation output), and adds plain language insights. In certain embodiments, the most important results are selected in block 616. From block 616, processing continues to block 620 (FIG. 6B).

In block 608, the statistical engine 112 performs predictive modeling and outputs, for each target, for each model, statistical output 618. Further details of predictive modeling are described with reference to FIG. 9. In certain embodiments, the statistical output 618 includes, for each target (in decreasing order of interestingness), for each model (in decreasing order of interestingness), statistical output (e.g., goodness-of-fit test statistics, parameter estimates, etc.) and visualizations. In block 620, the AIS engine 110 receives the statistical output 618, selects a subset of results, consolidates numeric and visual output with statistical results 614 (i.e., exploration enablement output), and adds plain language insights. In certain embodiments, the most important results are selected in block 620.

In block 622, the AIS engine 110, for each model in a first subset of models (e.g., top models), utilizes key predictive model statistical and visualization output and links this output to relevant field-based output. In block 624, the AIS engine 110, for each model in a second subset of models (e.g., non-top models), reduces the predictive model output to summary measures (e.g., overall accuracy). In block 626, the AIS engine 110 generates a report. In certain embodiments, the report includes an executive summary and interactive exploratory output. In certain embodiments, the executive summary includes: 1) key findings across all analyses, 2) consolidated insights for top target (including univariate descriptive statistics, unusual records, top predictors, and predictor interaction effects), and 3) other key findings. In certain embodiments, the interactive exploratory output includes: 1) univariate exploration, 2) bivariate exploration, 3) multivariate exploration, 4) views that incorporate descriptive and/or predictive output depending on the selected fields (e.g., selected by a user), and 5) views that include visualizations, textual interpretations, dynamic visual insights, and numeric results, with progressive disclosure of more technical results via an interactive hierarchy.

Figure 7:
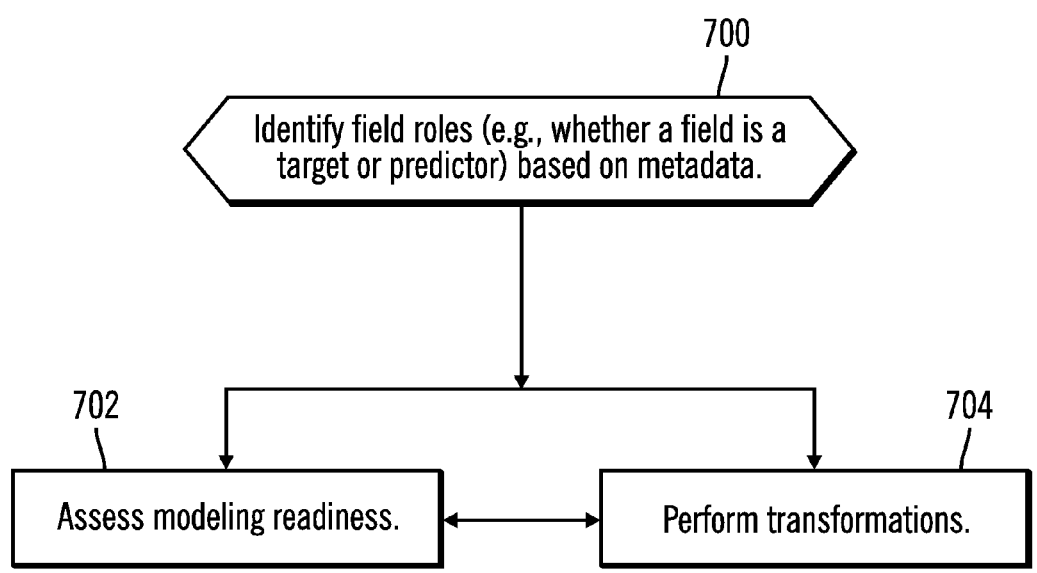
FIG. 7 illustrates, in a flow diagram, further details of data evaluation in accordance with certain embodiments.

FIG. 7 illustrates, in a flow diagram, further details of data evaluation in accordance with certain embodiments. In FIG. 7, control begins at block 700 with the statistical engine 112 identifying field roles (e.g., whether a field is a target or predictor) based on metadata. From block 700, processing may continue simultaneously or serially to both blocks 702 and 704. In block 702, the statistical engine 112 assesses modeling readiness (e.g., checks for zero inflation). In block 704, the statistical engine 112 performs transformations (e.g., to remove zero inflation). Zero inflation may be described as an excess of records with value 0 for a continuous field (e.g., if the continuous field contains insurance claim data, then most records will have value $0.00 because most individuals did not file a claim in the reporting period; and this continuous field might be transformed by recoding each instance of $0.00 to a missing value so that values of $0.00 are not used when descriptive statistics and predictive models are computed.)

Figure 8:
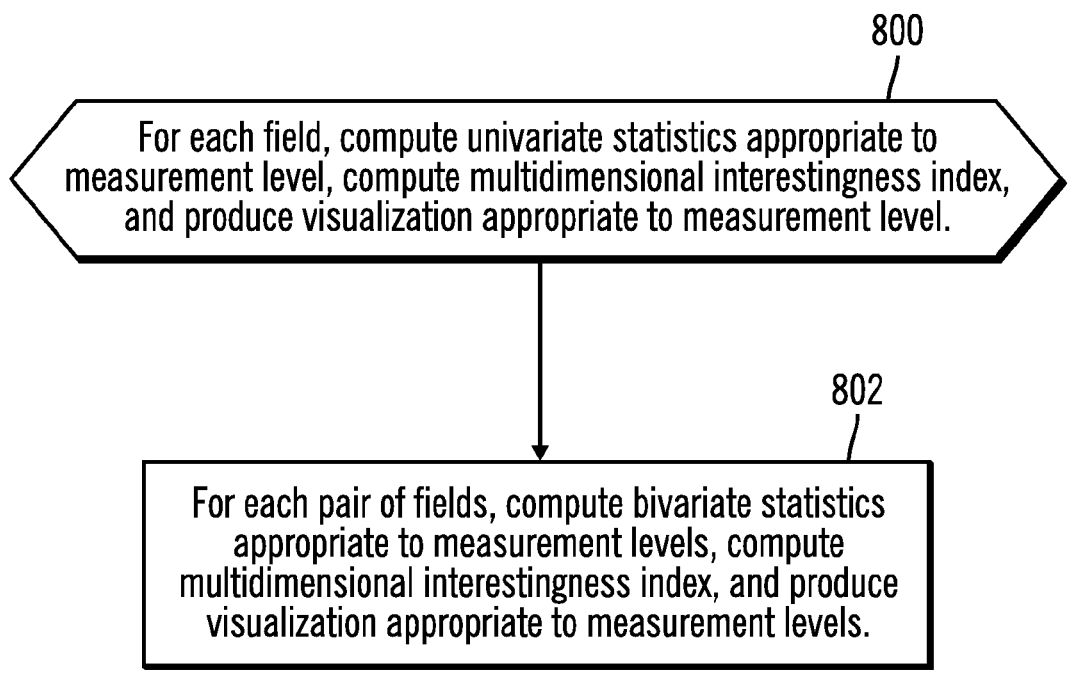
FIG. 8 illustrates, in a flow diagram, further details of exploration enablement in accordance with certain embodiments.

FIG. 8 illustrates, in a flow diagram, further details of exploration enablement in accordance with certain embodiments. In FIG. 8, control begins at block 800 with the statistical engine 112, for each field, computing univariate statistics appropriate to a measurement level (e.g., means and related statistics for a continuous field), computing a multidimensional interestingness index, and producing a visualization appropriate to the measurement level (e.g., a histogram for a continuous field). In block 802, the statistical engine 112, for each pair of fields, computes bivariate statistics appropriate to measurement levels (e.g., the effect-size measure eta squared if one field is categorical and the other is continuous), computes a multidimensional interestingness index, and produces a visualization appropriate to the measurement levels (e.g., a boxplot for a pair of fields where one is categorical and the other continuous). In this scenario, a boxplot may be described as a graph showing summary statistics (e g, minimum, 25th percentile, median, 75th percentile, and maximum) and outliers of the continuous field within each level of the categorical field.

Figure 9A:
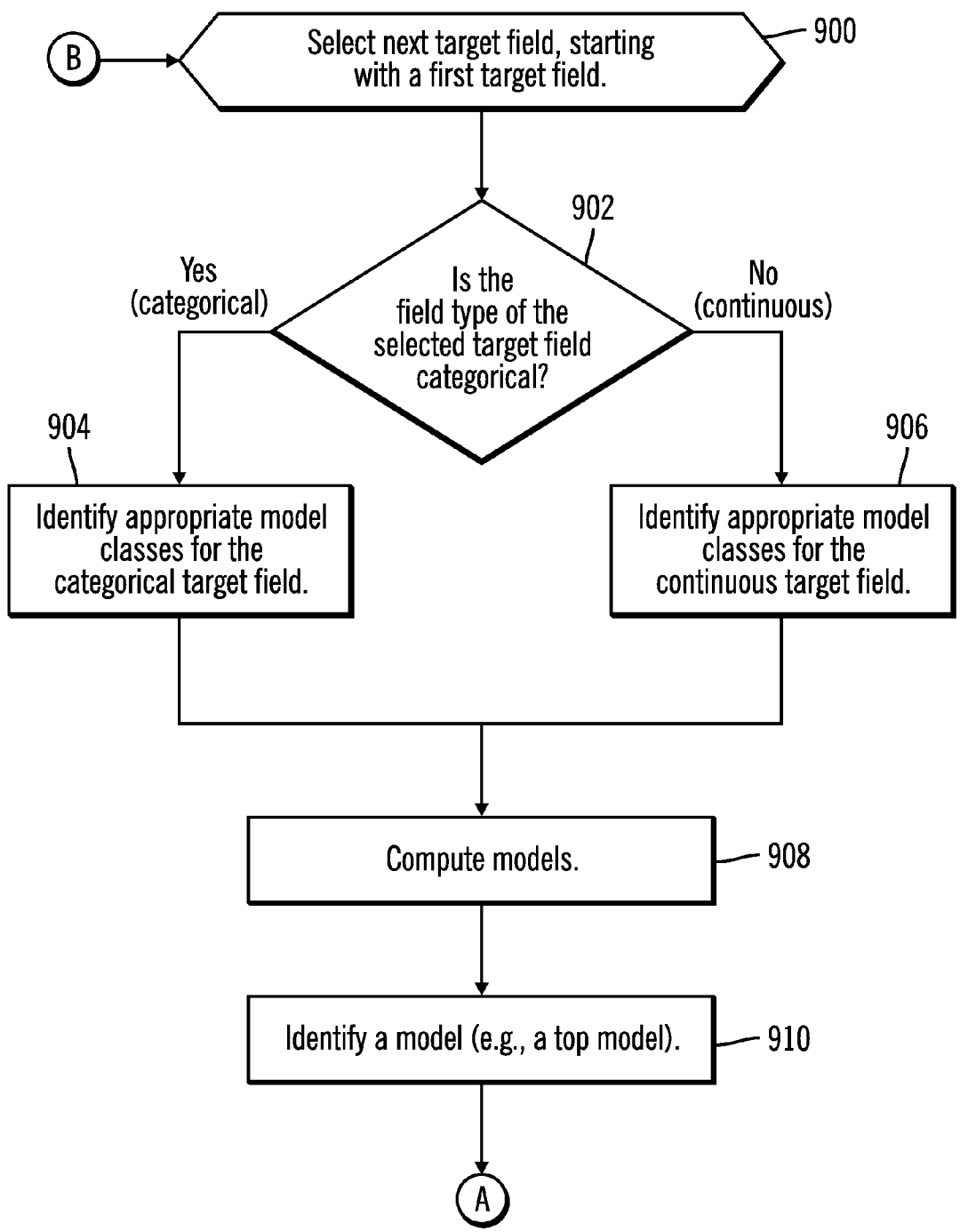
FIG. 9 illustrates in a flow diagram, further details of predictive modeling in accordance with certain embodiments.
Figure 9B:
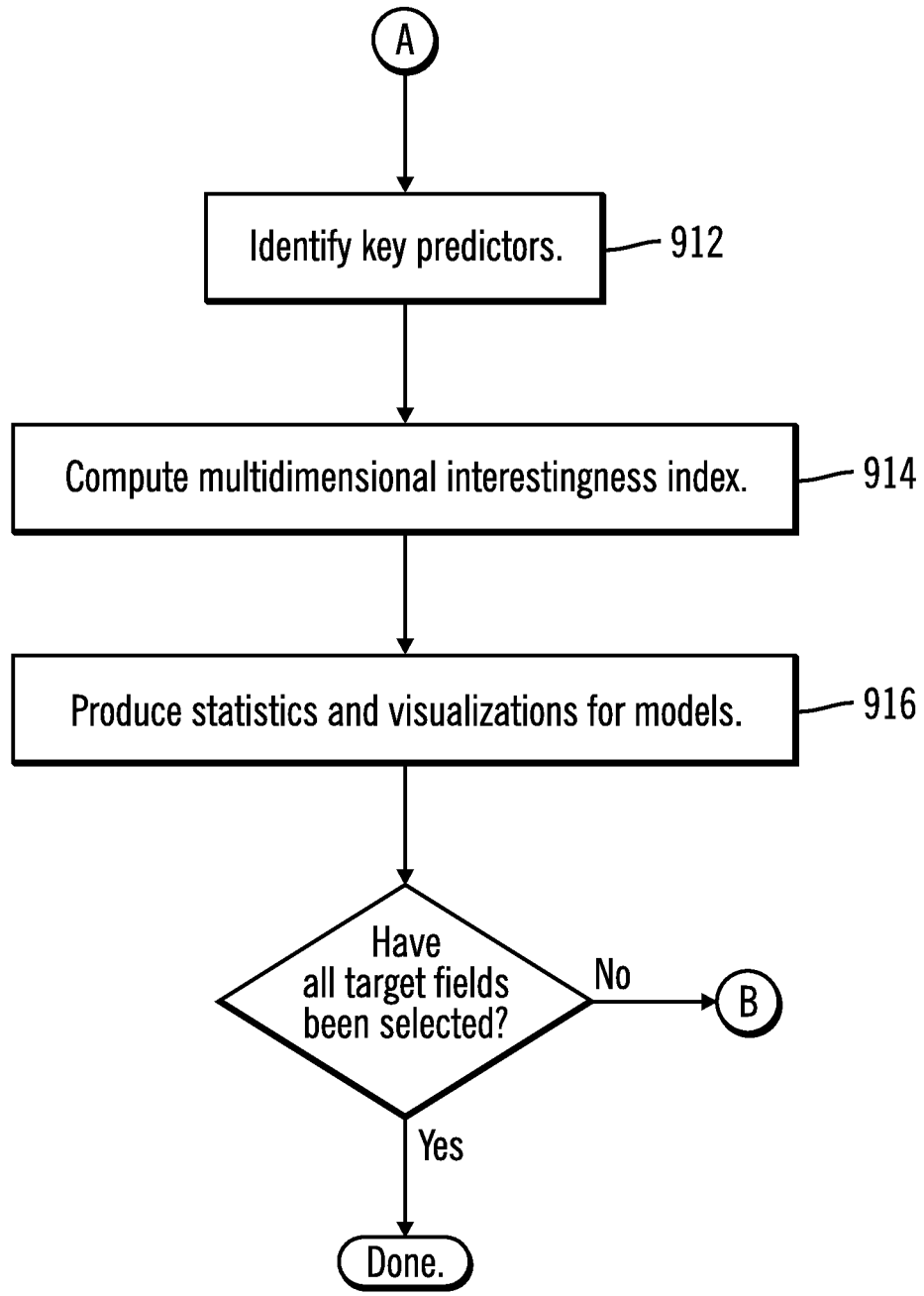

FIG. 9 illustrates in a flow diagram, further details of predictive modeling in accordance with certain embodiments. FIG. 9 is formed by FIG. 9A and FIG. 9B. In FIG. 9A, control begins at block 900 with the statistical engine 112 selecting a next target field, starting with a first target field. In block 902, the statistical engine determines whether the field type of the target field is categorical. If so, processing continues to block 904, otherwise, processing continues to block 906. In block 904, the statistical engine 112 identifies appropriate model classes for the categorical target field (e.g., generalized liner model, decision tree, etc.). In block 906, the statistical engine 112 identifies appropriate model classes for the continuous target field (e.g., linear model, decision tree, etc.).

In block 908, the statistical engine 112 computes models. In block 910, the statistical engine identifies a model (e.g., a top model). From block 910, processing continues to block 912 (FIG. 9B). In block 912, the statistical engine 112 identifies key predictors. In block 914, the statistical engine computes a multidimensional interestingness index. In block 916, the statistical engine 112 produces statistics and visualizations for models.

Figure 12:
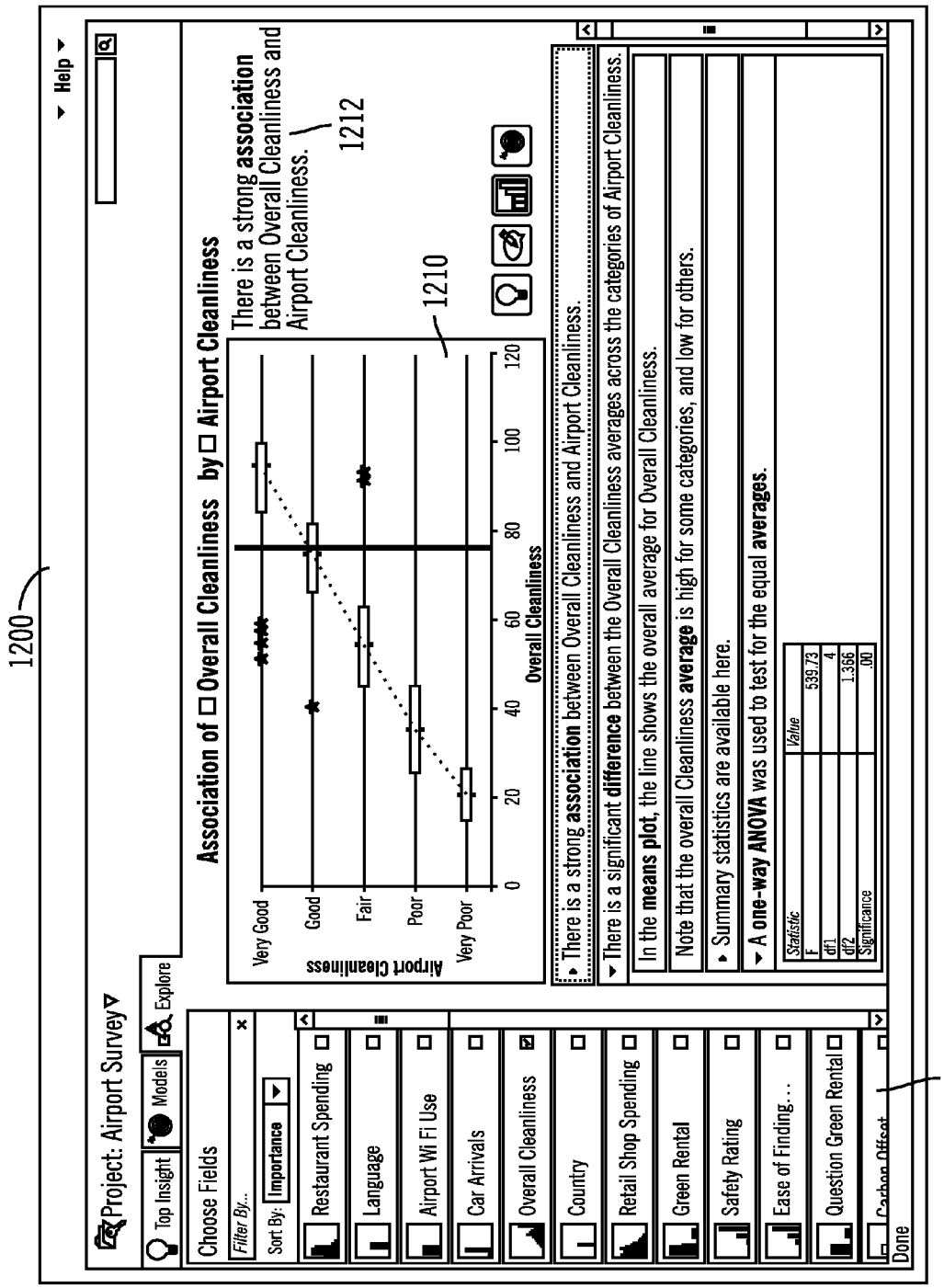
FIG. 12 illustrates interactive exploratory output in accordance with certain embodiments.

Merely to enhance understanding of embodiments, an example will be provided herein with reference to FIGS. 10-12 to illustrate how the AIS engine 110 identifies relationships between the elements of the result sets using heuristics, business rules, and/or prior actions of one or more users and generates an executive summary highlighting key findings across all analyses. This is merely one example that illustrates a small amount of the volumes of output that are generated by a traditional statistical package and may be automatically summarized by embodiments, to avoid having a human analyst do summarization. In various embodiments, the AIS engine 110 may use other heuristics, as well as, business rules and/or prior actions of users, for this purpose.

For this example, an airport customer survey dataset is received. The airport customer survey measures satisfaction and spending behavior at the airport. For this example, the dataset contains 1,400 records and 48 fields, and the metadata identifies 4 target fields, 42 input fields, 1 record ID field, and 1 excluded field.

The statistics engine 112 automatically analyzes the dataset and metadata to produce the result sets, which are input for the AIS engine 110.

For this example, the result sets include:
Original and derived metadata.
46 univariate descriptive result sets.
  One result set for each target and input field.
  Each result set includes measures of central tendency, distribution tests, and other univariate statistics.
  Result sets are ordered by univariate importance indices.
(46*45)/2=1035 non-redundant bivariate descriptive result sets.
  One result set for each pair among the target and input fields.
  Each result set includes measures of association, significance tests, and other bivariate statistics.
  Sets are ordered by bivariate importance indices.
40 predictive model result sets.
  Each target has 10 top models, each of which corresponds to a result set.
  Each result set includes predictor importance, goodness of fit, and other predictive model statistics.
  Targets are ordered by importance.
  Within each target, models are ordered by predictive model importance indices.

FIG. 10 illustrates a subset of statistical relationships results in accordance with certain embodiments. FIG. 10 is formed by FIG. 10A, FIG. 10B, FIG. 10C, FIG. 10D, FIG. 10E, FIG. 10F, and FIG. 10G. The statistical relationship results are an example of sets of statistical results from block 614 that would be generated by performing the processing of block 802 for exploration enablement.

FIG. 10A illustrates bivariate statistics 1000 for the relationship between boarding area and airport rating. FIG. 10B illustrates bivariate statistics 1010 for the relationship between boarding area and art rating. FIG. 10C illustrates bivariate statistics 1020 for the relationship between barding area and restaurant rating. FIG. 10D illustrates univariate statistics and bivariate relationships 1022 among four target fields (overall satisfaction rating, overall cleanliness rating, restaurant spending, and retail shop spending). FIG. 10E illustrates bivariate statistics 1030 for the relationship between overall cleanliness and boarding area. FIG. 1 OF illustrates bivariate statistics 1040 for the relationship between overall cleanliness and language. FIG. 10G illustrates bivariate statistics 1050 for the relationship between overall cleanliness and airport rating.

Once the statistics engine 112 analyzes the dataset and generates information, the AIS engine 110 further summarizes and interprets the statistics in order to provide users with an easier to understand set of statistics. Using the example airport customer survey dataset, and with no specification by the user, the AIS engine 110 automatically selects top models, automatically creates the graphics, and automatically assembles the text insights and progressive disclosures for an executive summary and for interactive exploratory output.

FIG. 11 illustrates an executive summary 1100 in accordance with certain embodiments. The AIS engine 110 generates the executive summary 1100. Continuing with this example, the AIS engine 110 applies heuristics to generate the one-page executive summary 1100 of the statistical results. For purposes of this example, five heuristics will be provided below.

The AIS engine 110 apples heuristic 1 to generate a dataset characteristics table 1110. In particular, the AIS engine 110 obtains the number of records and fields, and a breakdown of the field types, from the metadata, and displays this information in the dataset characteristics table 1110.

The AIS engine 110 applies heuristic 2 to generate a univariate set. In particular, for the target with the highest importance index, the AIS engine 110 obtains the mean and distribution information from the target's univariate result set. Then, if the target distribution is negatively skewed and any records have low values, the AIS engine 110 identifies the record with the lowest value. Otherwise, if the target distribution is positively skewed and any records have high values, the AIS engine 110 identifies the record with the highest value. The AIS engine 110 populates a template string for heuristic 2.

The following is an example of a populated template string for heuristic 2:
  Overall Cleanliness has average value 75.86. However, some records have extremely low values, with record number 216 having the lowest (4.10).

The AIS engine 110 applies heuristic 3 to generate a predictive model for a predictive model set 1130. In particular, for the target with the highest importance index, the AIS engine 110 obtains the top three predictors, in order of importance, from the target's most important predictive model result set, and populates a template string for heuristic 3.

The following is an example of a populated template string for heuristic 3:
  The top three drivers of Overall Cleanliness are Restroom Cleanliness, Boarding Area Cleanliness, and Airport Cleanliness.

The AIS engine 110 applies heuristic 4 to generate another predictive model for the predictive model set 1130. In particular, for the target with the highest importance index, the AIS engine 110 obtains the top effect from the target's most important predictive model result set. If the top effect is a two-way interaction and any cells have unusually low or high predicted values, the AIS engine 110 populates the two-way template string for this heuristic and displays the two-way visualization 1140. That is, there is a two-way interaction effect in a linear predictive model. Otherwise, if the top effect is a main effect, the AIS engine 110 populates the one-way template string for heuristic 4 and displays the one-way visualization 1140.

The following is an example of a populated two-way template string for heuristic 4:
  For example, records with Very Poor responses for Boarding Area Cleanliness, and Fair or lower responses for Restroom Cleanliness, have unusually low Overall Cleanliness, as represented in the graphic, where lighter shades indicate lower Overall Cleanliness.

The AIS engine 110 applies heuristic 5 to generate a bivariate set. In particular, the AIS engine 110 obtains the most important bivariate relationship from the bivariate result set and populates a template string for heuristic 5, where the string version is based on the absolute strength of the relationship.

The following is an example of a populated template string for heuristic 5:

There is a very strong relationship between Terminal and Boarding Area. These fields may be redundant.

The executive summary 1100 results from applying heuristics to the statistical results. Referring to FIG. 11, the executive summary 1100 includes a dataset characteristics table 1110, an analytic techniques list 1120 that indicates the analytic techniques used for this executive summary 1100, predictive models 1130 that show interesting results for four targets, and other key findings 1150.

FIG. 12 illustrates interactive exploratory output 1200 in accordance with certain embodiments. The AIS engine 110 generates the interactive exploratory output 1200. The interactive exploratory output 1200 includes a visualization 1210 and a text insight 1212. As a user selects different fields 1220, the AIS engine 110 will modify the visualization and/or textual insights to reflect the new selection.

In certain embodiments, the original input is a single dataset containing raw data. Next, the statistics engine 112 performs a complete statistical data analysis, thereby generating a large amount of statistical information in the form of numeric tables, graphs, etc. Then, the AIS engine 110 receives this statistical information as input and further summarizes the statistical information into an executive summary for a user (e.g., a researcher or company executive). With embodiments, the executive summary includes a plain-language narrative highlighting key findings, which may be consumed by the researcher or executives with little or no statistical training The AIS engine 110 may be described as a general purpose automatic data analyzer encompassing univariate, bivariate, and multivariate descriptive statistics, predictive models, segmentation analysis, and visualizations of these results. The AIS engine provides plain-language interpretations of these multifaceted results, including an executive summary that consolidates them into an easily-understood narrative form.

In certain embodiments, the AIS engine 110 may use conditional logic to display insights in plain language. In such embodiments, depending on the results computed by the statistical engine 112 and using any relevant metadata, the AIS engine 110 uses a specific insight text template to construct sentences that interpret the results. In certain embodiments, the AIS engine 110 uses templates for plain-language interpretations of statistical results, to be filled in with metadata and statistical information as determined by a set of pre-defined rules.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool f configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
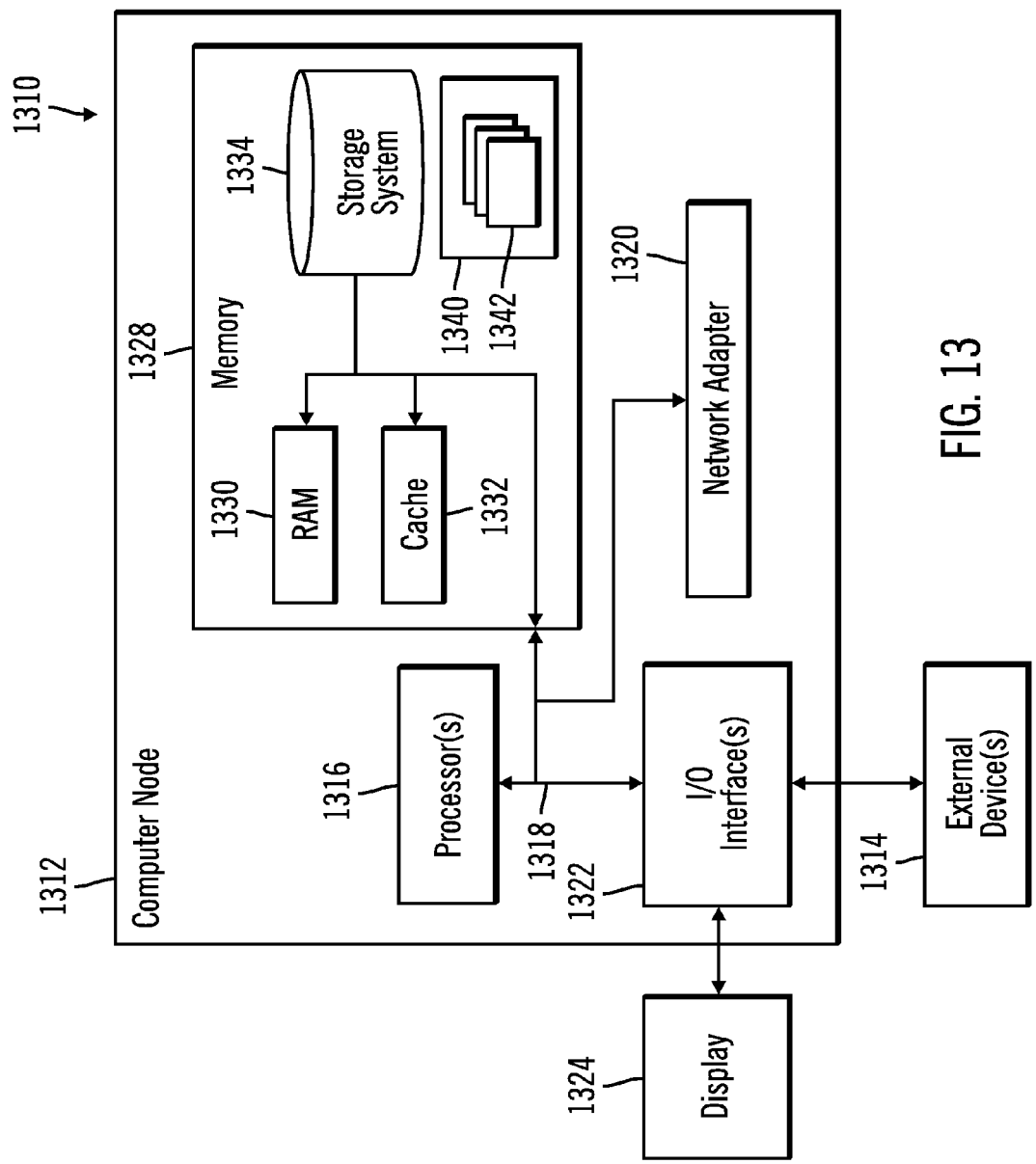
FIG. 13 depicts a cloud computing node in accordance with certain embodiments.

Referring now to FIG. 13, a schematic of an example of a cloud computing node is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in cloud computing node 1310 is shown in the form of a general-purpose computing device. The components of computer system/server 1312 may include, but are not limited to, one or more processors 1316 or processing units, a system memory 1328, and a bus 1318 that couples various system components including system memory 1328 to a processor 1316 or processing unit.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 14:
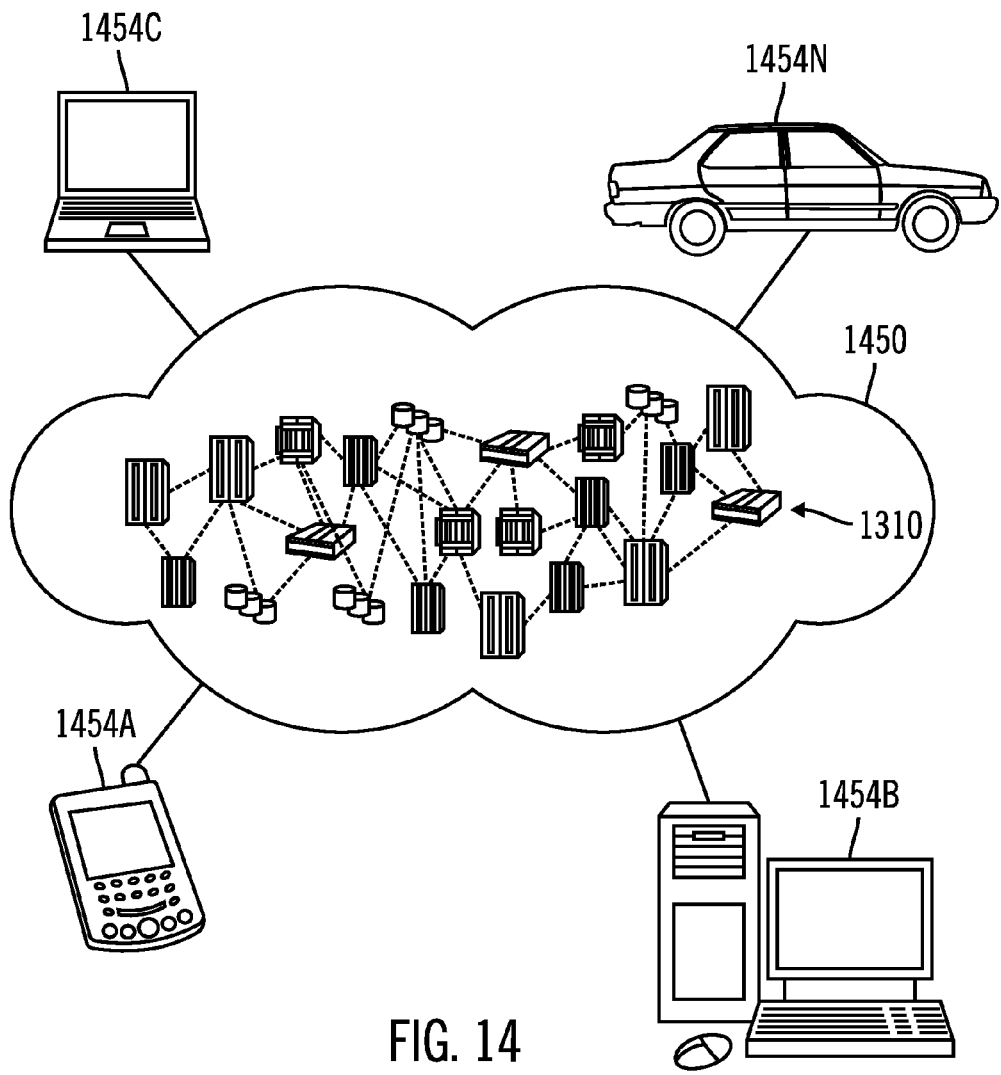
FIG. 14 depicts a cloud computing environment in accordance with certain embodiments.

Referring now to FIG. 14, illustrative cloud computing environment 1450 is depicted. As shown, cloud computing environment 1450 comprises one or more cloud computing nodes 1310 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1310 and cloud computing environment 1450 can communicate with any type of computerized device over any type of network and/or network addressable connection (e.g., using a web browser).

Figure 15:
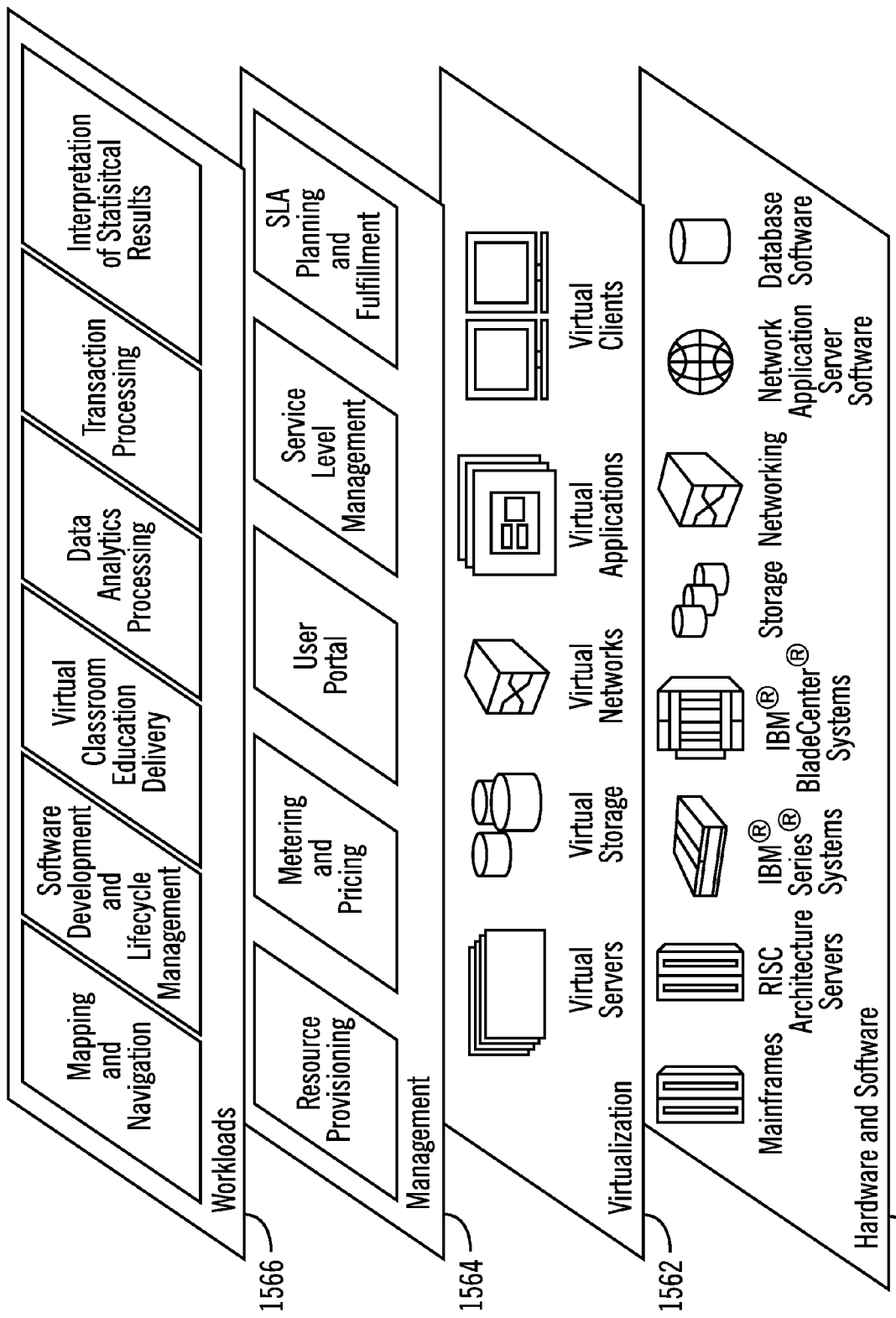
FIG. 15 depicts abstraction model layers in accordance with certain embodiments.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and interpretation of statistical results.

Thus, in certain embodiments, software or a program, implementing interpretation of statistical results in accordance with embodiments described herein, is provided as a service in a cloud environment.

In certain embodiments, the computing device 100 has the architecture of computing node 1310. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   generating, with a processor of a computer, an interestingness index for each field of fields in a dataset, wherein the interestingness index provides a summary and a ranking of the field;
   receiving, with the processor of the computer, multiple sets of statistical results generated for the dataset, wherein the multiple sets of statistical results comprise univariate statistics ordered according to a decreasing order of a first interestingness index and bivariate statistics for each pair of the fields ordered according to a decreasing order of a second interestingness index;
   generating, with the processor of the computer, a hierarchy of first insights based on a template for each type of statistical result of the multiple sets of statistical results, wherein the first insights provide relationships between the fields in plain language, and wherein a top level of the hierarchy provides a general insight and is associated with a first visualization, wherein a lower level of the hierarchy provides technical information and is associated with a second visualization to enable confirmation of the general insight, and wherein the type of statistical result comprises one of the univariate statistics and the bivariate statistics;
   identifying, with the processor of the computer, relationships between the first insights in the hierarchy to generate second insights comprising key findings;
   displaying, with the processor of the computer, an executive summary that highlights the key findings across multiple analytic techniques based on the identified relationships, wherein the executive summary includes 1) dataset characteristics for the fields in the data set displayed in a first portion of the executive summary, 2) analytic techniques used to generate the executive summary displayed in a second portion of the executive summary, 3) a subset of the first insights displayed in a third portion of the executive summary, 4) the key findings displayed in a fourth portion of the executive summary, and 5) the first visualization displayed in a fifth portion of the executive summary;
   displaying, with the processor of the computer, a first interactive visualization based on the executive summary, wherein the first interactive visualization includes 1) a list of fields with one or more selected fields displayed in a first portion of the first interactive visualization, 2) a visualization for one or more of the selected fields displayed in a second portion of the first interactive visualization, and 3) a plain language insight selected from a plurality of plain language insights associated with the visualization displayed in a third portion of the first interactive visualization;
   in response to selection of a different plain language insight of the plurality of plain language insights, dynamically changing, with the processor of the computer, the visualization to include graphical annotations that depict the different plain language insight; and
   in response to selection of one or more different fields from the list of fields, displaying, with the processor of the computer, a second interactive visualization with another visualization for the selected one or more different fields and another plain language insight associated with the another visualization.

2. The method of claim 1, wherein the relationships are identified using one or more of heuristics, business rules, and prior actions of a user.

3. The method of claim 1, further comprising:
   generating third insights based on a subset of data characteristics derived from data evaluation.

4. The method of claim 1, wherein a Software as a Service (SaaS) is configured to perform method operations.

5. A computer system, comprising:
   a processor; and
   a storage device connected to the processor, wherein the storage device has stored thereon a program, and wherein the processor is configured to execute instructions of the program to perform operations, wherein the operations comprise:
   generating an interestingness index for each field of fields in a dataset, wherein the interestingness index provides a summary and a ranking of the field;
   receiving multiple sets of statistical results generated for the dataset, wherein the multiple sets of statistical results comprise univariate statistics ordered according to a decreasing order of a first interestingness index and bivariate statistics for each pair of the fields ordered according to a decreasing order of a second interestingness index;
   generating a hierarchy of first insights based on a template for each type of statistical result of the multiple sets of statistical results, wherein the first insights provide relationships between the fields in plain language, and wherein a top level of the hierarchy provides a general insight and is associated with a first visualization, wherein a lower level of the hierarchy provides technical information and is associated with a second visualization to enable confirmation of the general insight, and wherein the type of statistical result comprises one of the univariate statistics and the bivariate statistics;

identifying relationships between the first insights in the hierarchy to generate second insights comprising key findings;

displaying an executive summary that highlights the key findings across multiple analytic techniques based on the identified relationships, wherein the executive summary includes 1) dataset characteristics for the fields in the data set displayed in a first portion of the executive summary, 2) analytic techniques used to generate the executive summary displayed in a second portion of the executive summary, 3) a subset of the first insights displayed in a third portion of the executive summary, 4) the key findings displayed in a fourth portion of the executive summary, and 5) the first visualization displayed in a fifth portion of the executive summary;

displaying a first interactive visualization based on the executive summary, wherein the first interactive visualization includes 1) a list of fields with one or more selected fields displayed in a first portion of the first interactive visualization, 2) a visualization for one or more of the selected fields displayed in a second portion of the first interactive visualization, and 3) a plain language insight selected from a plurality of plain language insights associated with the visualization displayed in a third portion of the first interactive visualization;

in response to selection of a different plain language insight of the plurality of plain language insights, dynamically changing the visualization to include graphical annotations that depict the different plain language insight; and in response to selection of one or more different fields from the list of, displaying a second interactive visualization with another visualization for the selected one or more different fields and another plain language insight associated with the another visualization.

6. The computer system of claim 5, wherein the relationships are identified using one or more of heuristics, business rules, and prior actions of a user.

7. The computer system of claim 5, wherein the operations further comprise:

generating third insights based on a subset of data characteristics derived from data evaluation.

8. The computer system of claim 5, wherein a Software as a Service (SaaS) is provided to perform system operations.

9. A computer program product, comprising:

a non-transitory computer readable storage medium having computer readable program code embodied therewith, wherein, the computer readable program code, when executed by at least one processor of a computer, is configured to perform operations comprising:

generating, with the at least one processor of the computer, an interestingness index for each field of fields in a dataset, wherein the interestingness index provides a summary and a ranking of the field;

receiving, with the at least one processor of the computer, multiple sets of statistical results generated for the dataset, wherein the multiple sets of statistical results comprise univariate statistics ordered according to a decreasing order of a first interestingness index and bivariate statistics for each pair of the fields ordered according to a decreasing order of a second interestingness index;

generating, with the at least one processor of the computer, a hierarchy of first insights based on a template for each type of statistical result of the multiple sets of statistical results, wherein the first insights provide relationships between the fields in plain language, wherein a top level of the hierarchy provides a general insight and is associated with a first visualization, and wherein a lower level of the hierarchy provides technical information and is associated with a second visualization to enable confirmation of the general insight, and wherein the type of statistical result comprises one of the univariate statistics and the bivariate statistics;

identifying, with the at least one processor of the computer, relationships between the first insights in the hierarchy to generate second insights comprising key findings;

displaying, with the at least one processor of the computer, an executive summary that highlights the key findings across multiple analytic techniques based on the identified relationships, wherein the executive summary includes 1) dataset characteristics for the fields in the data set displayed in a first portion of the executive summary, 2) analytic techniques used to generate the executive summary displayed in a second portion of the executive summary, 3) a subset of the first insights displayed in a third portion of the executive summary, 4) the key findings displayed in a fourth portion of the executive summary, and 5) the first visualization displayed in a fifth portion of the executive summary;

displaying, with the at least one processor of the computer, a first interactive visualization based on the executive summary, wherein the first interactive visualization includes 1) a list of fields with one or more selected fields displayed in a first portion of the first interactive visualization, 2) a visualization for one or more of the selected fields displayed in a second portion of the first interactive visualization, and 3) a plain language insight selected from a plurality of plain language insights associated with the visualization displayed in a third portion of the first interactive visualization;

in response to selection of a different plain language insight of the plurality of plain language insights, dynamically changing, with the at least one processor of the computer, the visualization to include graphical annotations that depict the different plain language insight; and in response to selection of one or more different fields from the list of fields, displaying, with the at least one processor of the computer, a second interactive visualization with another visualization for the selected one or more different fields and another plain language insight associated with the another visualization.

10. The computer program product of claim 9, wherein the relationships are identified using one or more of heuristics, business rules, and prior actions of a user.

11. The computer program product of claim 9, wherein the computer readable program code, when executed by the at least one processor, is configured to perform operations comprising:

generating, with the at least one processor of the computer, third insights based on a subset of data characteristics derived from data evaluation.

12. The computer program product of claim 9, wherein a Software as a Service (SaaS) is configured to perform computer program product operations.

\* \* \* \* \*